(12) United States Patent
Miyasaka et al.

(10) Patent No.: US 11,211,009 B2
(45) Date of Patent: Dec. 28, 2021

(54) ELECTRO-OPTICAL DEVICE AND ELECTRONIC APPARATUS

(71) Applicant: SEIKO EPSON CORPORATION, Tokyo (JP)

(72) Inventors: Mitsutoshi Miyasaka, Suwa (JP); Yoichi Momose, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/926,811

(22) Filed: Jul. 13, 2020

(65) Prior Publication Data

US 2020/0357339 A1 Nov. 12, 2020

Related U.S. Application Data

(63) Continuation of application No. 16/172,937, filed on Oct. 29, 2018, now Pat. No. 10,748,487.

(30) Foreign Application Priority Data

Oct. 30, 2017 (JP) ................ 2017-208899

(51) Int. Cl.
*G09G 3/3258* (2016.01)
*G02B 27/01* (2006.01)
(Continued)

(52) U.S. Cl.
CPC ....... *G09G 3/3258* (2013.01); *G02B 27/0172* (2013.01); *G09G 3/3233* (2013.01); *G02B 2027/0178* (2013.01); *G09G 3/2022* (2013.01); *G09G 2300/0857* (2013.01); *G09G 2310/0262* (2013.01); *G09G 2310/08* (2013.01);
(Continued)

(58) Field of Classification Search
CPC .......... G09G 3/22; G09G 3/3208; G09G 3/30; G09G 3/3225; G09G 3/3233; G09G 3/3241; G09G 3/3266; G09G 3/3275; G09G 3/3258
See application file for complete search history.

(56) References Cited

U.S. PATENT DOCUMENTS 9,064,457 B2 * 6/2015 Kawabe ............... G09G 3/3648
10,262,586 B2 4/2019 Lin et al.
(Continued)

FOREIGN PATENT DOCUMENTS

JP 2002-287695 A 10/2002
JP 2004-62161 A 2/2004
(Continued)

*Primary Examiner* — William Lu
(74) *Attorney, Agent, or Firm* — Oliff PLC

(57) ABSTRACT

An electro-optical device includes a scan line, a data line, a pixel circuit provided at an intersection of the scan line and the data line, a first high potential line, a first low potential line, a second high potential line, and a second low potential line. The pixel circuit includes a light emitting device, a memory circuit disposed between the first high potential line and the first low potential line, a first transistor of N-type including a gate electrically connected to the memory circuit, and a second transistor disposed between the memory circuit and the data line. The light emitting device and the first transistor are disposed in series between the second high potential line and the second low potential line.

18 Claims, 13 Drawing Sheets

(51) Int. Cl.
*G09G 3/3233* (2016.01)
*G09G 3/20* (2006.01)

(52) U.S. Cl.
CPC .............. *G09G 2320/0233* (2013.01); *G09G 2320/045* (2013.01); *G09G 2330/021* (2013.01)

(56) References Cited

U.S. PATENT DOCUMENTS

| | | | |
|---|---|---|---|
| 10,497,312 B2 * | 12/2019 | Miyasaka | G09G 3/3266 |
| 10,748,487 B2 * | 8/2020 | Miyasaka | G02B 27/0172 |
| 2002/0070913 A1 | 6/2002 | Kimura et al. | |
| 2002/0140642 A1 | 10/2002 | Okamoto | |
| 2002/0195968 A1 * | 12/2002 | Sanford | G09G 3/325 |
| | | | 315/169.3 |
| 2004/0047530 A1 | 3/2004 | Hara et al. | |
| 2005/0206635 A1 * | 9/2005 | Hashimoto | G09G 3/3614 |
| | | | 345/204 |
| 2007/0035340 A1 * | 2/2007 | Kimura | G09G 3/325 |
| | | | 327/524 |
| 2007/0046612 A1 * | 3/2007 | Okumura | G09G 3/3614 |
| | | | 345/98 |
| 2009/0079679 A1 * | 3/2009 | Nam | G09G 3/3233 |
| | | | 345/82 |
| 2014/0267449 A1 * | 9/2014 | Hong | G09G 3/3659 |
| | | | 345/690 |
| 2017/0124968 A1 * | 5/2017 | Shima | G02F 1/13624 |
| 2018/0166020 A1 * | 6/2018 | Hwang | G09G 3/3233 |
| 2018/0182293 A1 * | 6/2018 | Chaji | G09G 3/3233 |
| 2018/0267350 A1 * | 9/2018 | Sakurai | G02F 1/1343 |

FOREIGN PATENT DOCUMENTS

| | | |
|---|---|---|
| JP | 2004-62163 A | 2/2004 |
| JP | 2004-062199 A | 2/2004 |
| JP | 2004-163601 A | 6/2004 |

\* cited by examiner

ELECTRO-OPTICAL DEVICE AND ELECTRONIC APPARATUS

CROSS REFERENCE TO RELATED APPLICATION

This application is a continuation of U.S. application Ser. No. 16/172,937, filed Oct. 29, 2018, the contents of which are incorporated herein by reference.

BACKGROUND

1. Technical Field

The present invention relates to an electro-optical device and an electronic apparatus.

2. Related Art

In recent years, head-mounted displays (HMDs) have been proposed that are a type of electronic apparatus that enables formation and viewing of a virtual image by directing image light from an electro-optical device to the pupil of an observer. One example of the electro-optical device used in these electronic devices is an organic electro-luminescence (EL) device that includes an organic EL element as a light-emitting element. The organic EL devices used in head-mounted displays are required to provide high resolution (fine pixels), multiple gray scales of display, and low power consumption.

In known organic EL devices, when a selecting transistor is brought to an ON-state by a scan signal supplied to a scan line, an electrical potential based on an image signal supplied from a data line is maintained in a capacitive element connected to the gate of a driving transistor. When the drive transistor is brought into the ON-state according to the potential maintained in the capacitive element, namely, the gate potential of the drive transistor, a current in amount according to the gate potential of the drive transistor flows to the organic EL element, and the organic EL element emits light at luminance according to the current amount.

In this way, the grey-scale display is performed by analog driving that controls the current flowing through the organic EL element according to the gate potential of the drive transistor in a typical organic EL device. Thus, variations in current-voltage characteristics and a threshold voltage of the drive transistor cause variations in brightness and shifts in grey-scale between pixels. As a result, display quality may decrease. In contrast, an organic EL device including a compensating circuit that compensates for variations in current-voltage characteristics and a threshold voltage of a drive transistor has been conceivable (for example, see JP-A-2004-062199).

SUMMARY

However, when a compensating circuit is provided as described in JP-A-2004-062199, a current also flows through the compensating circuit, which may cause an increase in power consumption. Furthermore, in order to achieve multiple-grey-scale display, known analog driving approaches require a capacitive element with a large capacitance to store image signals. This requirement is a trade-off with high resolution (fine pixels) and may result in an increased power consumption due to charging and discharging of the capacitive element. In other words, in the typical technology, an electro-optical device capable of displaying a high-resolution, multi-grey-scale, and high-quality image at low power consumption may be difficult to achieve.

The present invention is made to address at least some of the above-described issues, and can be realized as the following aspects or application examples.

Application Example 1

An electro-optical device according to the present application example includes at least a scan line, a data line, a pixel circuit provided at an intersection of the scan line and the data line, a first potential line supplied with a first potential, a second potential line supplied with a second potential lower than the first potential, a third potential line supplied with a third potential, and a fourth potential line supplied with a fourth potential lower than the third potential. The pixel circuit includes a light emitting device, a memory circuit disposed between the first potential line and the second potential line, a first transistor of N-type including a gate electrically connected to the memory circuit, and a second transistor disposed between the memory circuit and the data line. The light emitting device and the first transistor are disposed in series between the third potential line and the fourth potential line. The second potential is higher than the fourth potential.

According to the configuration of the present application example, the pixel circuit includes the memory circuit disposed between the first potential line and the second potential line, the first N-type transistor including the gate electrically connected to the memory circuit and the light emitting device are disposed in series between the third potential line and the fourth potential line, and the second transistor is disposed between the memory circuit and the data line. Thus, grey-scale display can be performed by writing a digital signal expressed by binary values of ON and OFF to the memory circuit through the second transistor, and controlling the ratio of emission to non-emission through the first transistor. In this way, the effect of variation in the current-voltage characteristics and the threshold voltage of each transistor can be minimized and the variations in brightness and shifts in grey-scale between pixels can be reduced without a compensating circuit. In the digital driving, the number of grey-scales can be easily increased without a capacitive element by increasing the number of subfields that serve as units for controlling emission and non-emission of the light emitting device in a field displaying a single image. Further, the need for using a large capacitive element is eliminated so that finer pixels can be achieved. In this way, finer pixels and a higher resolution can be achieved and power consumption due to charging and discharging of the capacitive element can also be reduced.

Furthermore, the second potential is higher than the fourth potential, so that the potential difference between the first potential and the fourth potential can be made greater than the potential difference between the first potential and the second potential accordingly. Thus, when an image signal stored in the memory circuit becomes the first potential on the high potential side corresponding to emission and the first transistor is brought into the ON-state, the first potential as the gate potential of the first transistor becomes higher than the fourth potential as the source potential of the first transistor, such that the gate-source voltage of the first transistor can be made greater than the operating voltage of the memory circuit. In this way, the first transistor can be operated in a substantially linear fashion (hereinafter simply referred to as "linearly operated") even with a decreased operating voltage of the memory circuit and the effect of variation in the current-voltage characteristics and the threshold voltage of the first transistor can be eliminated during emission of the light emitting device, thus leading to improved uniformity of luminance. As a result, the electro-optical device capable of displaying a high-resolution, multi-grey-scale, and high-quality image at low power consumption can be achieved.

Application Example 2

In the electro-optical device according to the present application example, the potential difference between the first potential and the second potential may be smaller than the potential difference between the third potential and the fourth potential.

According to the configuration of the present application example, the low-voltage power supplied with the first potential and the second potential is used to operate the memory circuit. This allows the use of smaller memory circuits that can operate at high speed. On the other hand, since a high-voltage power supplied with the third potential and the fourth potential is used to cause emission of the light emitting device, the luminance of the light emitting device can be increased. As a result, the electro-optical device that operates at a higher speed and achieves brighter display can be achieved.

Application Example 3

In the electro-optical device according to the present application example, a potential difference between the second potential and the fourth potential may be smaller than a threshold voltage of the first transistor.

According to the configuration of the present application example, when an image signal stored in the memory circuit becomes the second potential on the low potential side corresponding to non-emission and the first transistor is then brought into the OFF-state, the potential difference between the second potential and the fourth potential, which is a gate-source voltage of the first transistor, is smaller than the threshold voltage of the first transistor. Thus, the first transistor can be reliably in the OFF-state. In this way, even with two kinds of electrical systems of the low-voltage power and the high-voltage power being used, the non-emission can be reliably achieved when the light emitting device does not need to emit light.

Application Example 4

In the electro-optical device according to the present application example, a potential difference between the first potential and the fourth potential may be greater than a threshold voltage of the first transistor.

According to the configuration of the present application example, when an image signal stored in the memory circuit becomes the first potential on the high potential side corresponding to emission and the first transistor is then brought into the ON-state, the potential difference between the first potential and the fourth potential, which is a gate-source voltage of the first transistor, is greater than the threshold voltage of the first transistor. Thus, the first transistor can be reliably in the ON-state. In this way, even with two kinds of electrical systems of the low-voltage power and the high-voltage power being used, the emission can be reliably achieved when the light emitting device needs to emit light.

Application Example 5

In the electro-optical device according to the present application example, a drain of the first transistor may be electrically connected to the light emitting device.

According to the configuration of the application example, a drain of the first N-type transistor disposed in series with the light emitting device between the third potential line and the fourth potential line is electrically connected to the light emitting device, and thus a source of the first transistor is electrically connected to the fourth potential line. Thus, when the first transistor is in the ON-state, a gate-source voltage of the first transistor can be sufficiently increased, and the first transistor can be linearly operated. In other words, even when the first transistor has a small source-drain voltage, electric conductivity of the first transistor can be increased. In this way, most of the potential difference between the third potential and the fourth potential applies to the light emitting device. Thus, the light-emitting device becomes less susceptible to variation in the threshold voltage of the first transistor during emission. As a result, variations in brightness and shifts in grey-scale between pixels can be further reduced.

Application Example 6

In the electro-optical device according to the present application example, an ON-resistance of the first transistor may be sufficiently lower than an ON-resistance of the light emitting device.

According to the configuration of the present application example, when the light emitting device emits light while the first transistor and then the light emitting device are brought into the ON-state, the first transistor can be linearly operated. As a result, most of a potential drop occurring across the light emitting device and the first transistor applies to the light emitting device. Thus, the light emitting element becomes less susceptible to variation in the threshold voltage of the first transistor during emission. In this way, variations in brightness and shifts in grey-scale between pixels can be reduced.

Application Example 7

The electro-optical device according to the present application example may include an enable line. The pixel circuit may include a third transistor including a gate electrically connected to the enable line. The light emitting device, the first transistor, and the third transistor may be disposed in series between the third potential line and the fourth potential line.

According to the configuration of the present application example, the third transistor can be individually controlled by the enable line. In other words, a period for writing an image signal to the memory circuit and a display period in which the light emitting device of the pixel circuit may be caused to emit light can be controlled individually. The light emitting device is in the non-emission state in the period for writing an image signal to the memory circuit. After the image signal is written to the memory circuit, a certain period of time can be the display period, and accurate grey-scale expression can be achieved by time division driving.

Application Example 8

In the electro-optical device according to the present application example, a drain of the third transistor may be electrically connected to the light emitting device.

According to the configuration of the application example, a drain of the third transistor disposed in series with the light emitting device and the first transistor between the third potential line and the fourth potential line is electrically connected to the light emitting device, and thus a source of the third transistor is electrically connected to the third potential line or the fourth potential line. Specifically, the third transistor is disposed on the third potential line side with respect to the light emitting device when the third transistor is the P type. The third transistor is disposed on the fourth potential line side with respect to the light emitting device when the third transistor is the N-type. Thus, when the third transistor is in the ON-state, a gate-source voltage of the third transistor can be sufficiently increased, and the third transistor can be linearly operated. In other words, even when the third transistor has a small source-drain voltage, electric conductivity of the third transistor can be increased. In this way, most of a potential difference between the third potential and the fourth potential applies to the light emitting device. Thus, the light emitting device becomes less susceptible to variation in the threshold voltage of the third transistor during emission. As a result, variations in brightness and shifts in grey-scale between pixels can be further reduced.

Application Example 9

In the electro-optical device according to the present application example, an ON-resistance of the third transistor may be sufficiently lower than an ON-resistance of the light emitting device.

According to the configuration of the present application example, when the light emitting device emits light while the first transistor and the third transistor and then the light emitting device are brought into the ON-state, not only the first transistor but also the third transistor can be linearly operated. In this way, most of a potential drop occurring in the light emitting device and the first and third transistors applies to the light emitting device. Thus, the light emitting device becomes less susceptible to variation in the threshold voltage of the third transistor during emission. As a result, variations in brightness and shifts in grey-scale between pixels can be reduced.

Application Example 10

In the electro-optical device according to the present application example, when the second transistor is in an ON-state, the third transistor may be in an OFF-state.

According to the configuration of the present application example, the third transistor is in the OFF-state when the second transistor disposed between the memory circuit and the data line is in the ON-state. Thus, emission of the light emitting device can be stopped when an image signal is written to the memory circuit. In this way, a signal can be reliably written (or rewritten) to the memory circuit at low power consumption and a high speed, and false display and decreased quality of image display due to false writing of a signal can be suppressed. Furthermore, when an image signal is rewritten to the memory circuit, the light emitting device does not emit light. Thus, a transition state between emission and non-emission due to rewriting of an image signal can be eliminated. As a result, accurate grey-scale can be displayed in digital grey-scale display that controls emission and non-emission by time division.

Application Example 11

In the electro-optical device according to the present application example, a gate of the second transistor may be electrically connected to the scan line, and a non-active signal may be supplied to the enable line in a first period in which a selection signal is supplied to any of the scan lines.

According to the configuration of the present application example, the second transistor and the third transistor can be individually controlled by the scan line and the enable line. Then, the third transistor is in the ON-state in the first period in which the second transistor is brought into the ON-state by the selection signal. Thus, the first period can be a period for writing an image signal to the memory circuit while the light emitting device does not emit light.

Application Example 12

In the electro-optical device according to the present application example, a non-selection signal may be supplied to the scan line in a second period in which an active signal is supplied to the enable line.

According to the configuration of the present application example, the second transistor is in the OFF-state in the second period in which the third transistor is brought into the ON-state by the active signal. Thus, writing of an image signal to the memory circuit in the second period in which the light emitting device may emit light can be stopped. Since the first period and the second period can be individually controlled, the second period in which the light emitting device may emit light can have different lengths regardless of a length of the first period. In this way, display with higher grey-scale can be achieved by digital time division driving. Furthermore, a signal (active signal and non-active signal) supplied to the enable line can be shared among a plurality of pixels, and thus the electro-optical device can be easily driven even when some subfields have the second period shorter than one vertical period in which selection of all the scan lines is completed.

Application Example 13

An electronic apparatus according to the present application example includes the electro-optical device described in the above-described application example.

According to the configuration of the present application example, high quality of an image displayed in the electronic apparatus such as a head-mounted display can be achieved.

Application Example 14

An electro-optical device according to the present application example includes at least a scan line, a data line, a pixel circuit provided at an intersection of the scan line and the data line, a first potential line supplied with a first potential, a second potential line supplied with a second potential higher than the first potential, a third potential line supplied with a third potential, and a fourth potential line supplied with a fourth potential higher than the third potential. The pixel circuit includes a light emitting device, a memory circuit disposed between the first potential line and the second potential line, a first transistor of P type including a gate electrically connected to the memory circuit, and a second transistor disposed between the memory circuit and the data line. The light emitting device and the first transistor are disposed in series between the third potential line and the fourth potential line. The second potential is lower than the fourth potential.

According to the configuration of the present application example, the pixel circuit includes the memory circuit disposed between the first potential line and the second potential line, the first P-type transistor including the gate electrically connected to the memory circuit and the light emitting device disposed in series between the third potential line and the fourth potential line, and the second transistor disposed between the memory circuit and the data line. Thus, grey-scale display can be performed by writing a digital signal expressed by binary values of ON and OFF to the memory circuit through the second transistor and controlling the ratio of emission to non-emission of the light emitting device through the first transistor. In this way, the effect of variation in the current-voltage characteristics and the threshold voltage of each transistor can be reduced, such that variations in brightness and shifts in grey-scale between pixels can be reduced without a compensating circuit. In the digital driving, the number of grey-scales can be easily increased without a capacitive element by increasing the number of subfields being units for controlling emission and non-emission of the light emitting device in a field displaying one image. Further, a great capacitive element does not need to be possessed, and thus finer pixels can be achieved. In this way, finer pixels and a higher resolution can be achieved, and power consumption due to charge and discharge of the capacitive element can also be reduced.

Furthermore, the second potential is lower than the fourth potential, and thus a potential difference between the first potential and the fourth potential can be smaller than a potential difference between the first potential and the second potential accordingly. Thus, when an image signal stored in the memory circuit becomes the first potential on the low potential side corresponding to emission and the first transistor is then brought into the ON-state, the first potential being a gate potential is lower than the fourth potential being a source potential of the first transistor, and a gate-source voltage of the first transistor can be greater than an operating voltage of the memory circuit. In this way, the first transistor can operate in a linear fashion even with a reduced operation voltage of the memory circuit. Thus, the light emitting device becomes less susceptible to variation in the current-voltage characteristics or the threshold voltage of the first transistor during emission, thus leading to an improved uniformity of luminance. As a result, the electro-optical device capable of displaying a high-resolution, multi-grey-scale, and high-quality image at low power consumption can be achieved.

Application Example 15

In the electro-optical device according to the present application example, a potential difference between the second potential and the first potential may be smaller than a potential difference between the fourth potential and the third potential.

According to the configuration of the present application example, a low-voltage power supplied with the first potential and the second potential causes the memory circuit to operate, and thus a finer memory circuit can be achieved and the memory circuit can operate at a high speed. On the other hand, a high-voltage power supplied with the third potential and the fourth potential causes the light emitting device to emit light, and thus luminance of the light emitting device can be increased. As a result, the electro-optical device that operates at a higher speed and achieves brighter display can be achieved.

Application Example 16

In the electro-optical device according to the present application example, a potential difference between the second potential and the fourth potential may be greater than a threshold voltage of the first transistor.

According to the configuration of the present application example, when an image signal stored in the memory circuit becomes the second potential on the high potential side corresponding to non-emission and the first transistor is then brought into the OFF-state, the potential difference between the second potential and the fourth potential, which is a gate-source voltage of the first transistor, is greater than the threshold voltage of the first transistor. Thus, the first transistor can be reliably in the OFF-state. In this way, even with two kinds of electrical systems of the low-voltage power and the high-voltage power being used, the non-emission can be reliably achieved when the light emitting device does not need to emit light.

Application Example 17

In the electro-optical device according to the present application example, a potential difference between the first potential and the fourth potential may be smaller than a threshold voltage of the first transistor.

According to the configuration of the present application example, when an image signal stored in the memory circuit becomes the first potential on the low potential side corresponding to emission and the first transistor is then brought into the ON-state, the potential difference between the first potential and the fourth potential, which is a gate-source voltage of the first transistor, is smaller than the threshold voltage of the first transistor. Thus, the first transistor can be reliably in the ON-state. In this way, even with two kinds of electrical systems of the low-voltage power and the high-voltage power being used, the light emission can be reliably achieved when the light emitting device needs to emit light.

Application Example 18

In the electro-optical device according to the present application example, a drain of the first transistor may be electrically connected to the light emitting device.

According to the configuration of the application example, a drain of the first P-type transistor disposed in series with the light emitting device between the third potential line and the fourth potential line is electrically connected to the light emitting device, and thus a source of the first transistor is electrically connected to the fourth potential line. Thus, when the first transistor is in the ON-state, a gate-source voltage of the first transistor can be sufficiently increased, and the first transistor can be linearly operated. In other words, even when the first transistor has a small source-drain voltage, electric conductivity of the first transistor can be increased. In this way, most of a potential difference between the third potential and the fourth potential applies to the light emitting device. Thus, the light emitting device becomes less susceptible to variation in the threshold voltage of the first transistor during emission. As a result, variations in brightness and shifts in grey-scale between pixels can be further reduced.

Application Example 19

In the electro-optical device according to the present application example, an ON-resistance of the first transistor may be sufficiently lower than an ON-resistance of the light emitting device.

According to the configuration of the present application example, when the light emitting device emits light while the first transistor and then the light emitting device are brought into the ON-state, the first transistor can be linearly operated. As a result, most of a potential drop occurring in the light emitting device and the first transistor applies to the light emitting device. Thus, the light emitting device becomes less susceptible to variation in the threshold voltage of the first transistor during emission. In this way, variations in brightness and shifts in grey-scale between pixels can be reduced.

Application Example 20

The electro-optical device according to the present application example may include an enable line. The pixel circuit may include a third transistor including a gate electrically connected to the enable line. The light emitting device, the first transistor, and the third transistor may be disposed in series between the third potential line and the fourth potential line.

According to the configuration of the present application example, the third transistor can be individually controlled by the enable line. In other words, a period for writing an image signal to the memory circuit and a display period in which the light emitting device of the pixel circuit may be caused to emit light can be controlled individually. The light emitting device is in the non-emission state in the period for writing an image signal to the memory circuit. After the image signal is written to the memory circuit, a certain period of time can be the display period, and accurate grey-scale expression can be achieved by time division driving.

Application Example 21

In the electro-optical device according to the present application example, a drain of the third transistor may be electrically connected to the light emitting device.

According to the configuration of the application example, a drain of the third transistor disposed in series with the light emitting device and the first transistor between the third potential line and the fourth potential line is electrically connected to the light emitting device, and thus a source of the third transistor is electrically connected to the third potential line or the fourth potential line. Specifically, the third transistor is disposed on the fourth potential line side with respect to the light emitting device when the third transistor is the P type. The third transistor is disposed on the third potential line side with respect to the light emitting device when the third transistor is the N-type. Thus, when the third transistor is in the ON-state, a gate-source voltage of the third transistor can be sufficiently increased, and the third transistor can be linearly operated. In other words, even when the third transistor has a small source-drain voltage, electric conductivity of the third transistor can be increased. In this way, most of a potential difference between the third potential and the fourth potential applies to the light emitting device. Thus, the light emitting device becomes less susceptible to variation in the threshold voltage of the third transistor during emission. As a result, variations in brightness and shifts in grey-scale between pixels can be further reduced.

Application Example 22

In the electro-optical device according to the present application example, an ON-resistance of the third transistor may be sufficiently lower than an ON-resistance of the light emitting device.

According to the configuration of the present application example, when the light emitting device emits light while the first transistor and the third transistor and then the light emitting device are brought into the ON-state, not only the first transistor but also the third transistor can be linearly operated. In this way, most of a potential drop occurring in the light emitting device and the first and third transistors applies to the light emitting device. Thus, the light emitting device becomes less susceptible to variation in the threshold voltage of the third transistor during emission. As a result, variations in brightness and shifts in grey-scale between pixels can be reduced.

Application Example 23

In the electro-optical device according to the present application example, when the second transistor is in an ON-state, the third transistor may be in an OFF-state.

According to the configuration of the present application example, the third transistor is in the OFF-state when the second transistor disposed between the memory circuit and the data line is in the ON-state. Thus, emission of the light emitting device can be stopped when an image signal is written to the memory circuit. In this way, a signal can be reliably written (or rewritten) to the memory circuit at low power consumption and a high speed, and false display and decreased quality of image display due to false writing of a signal can be suppressed. Furthermore, when an image signal is rewritten to the memory circuit, the light emitting device does not emit light. Thus, a transition state between emission and non-emission due to rewriting of an image signal can be eliminated. As a result, accurate grey-scale can be displayed in digital grey-scale display that controls emission and non-emission by time division.

Application Example 24

In the electro-optical device according to the present application example, a gate of the second transistor may be electrically connected to the scan line, and a non-active signal may be supplied to the enable line in a first period in which a selection signal is supplied to any of the scan lines.

According to the configuration of the present application example, the second transistor and the third transistor can be individually controlled by the scan line and the enable line. Then, the third transistor is in the ON-state in the first period in which the second transistor is brought into the ON-state by the selection signal. Thus, the first period can be a period for writing an image signal to the memory circuit while the light emitting device does not emit light.

Application Example 25

In the electro-optical device according to the present application example, a non-selection signal may be supplied to the scan line in a second period in which an active signal is supplied to the enable line.

According to the configuration of the present application example, the second transistor is in the OFF-state in the second period in which the third transistor is brought into the ON-state by the active signal. Thus, writing of an image signal to the memory circuit in the second period in which the light emitting device may emit light can be stopped. Since the first period and the second period can be individually controlled, the second period in which the light emitting device may emit light can have different lengths regardless of a length of the first period. In this way, display with higher grey-scale can be achieved by digital time division driving. Furthermore, a signal (active signal and non-active signal) supplied to the enable line can be shared among a plurality of pixels, and thus the electro-optical device can be easily driven even when some subfields have the second period shorter than one vertical period in which selection of all the scan lines is completed.

Application Example 26

An electronic apparatus according to the present application example includes the electro-optical device described in the above-described application example.

According to the configuration of the present application example, high quality of an image displayed in the electronic apparatus such as a head-mounted display can be achieved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, exemplary embodiments of the invention will be described with reference to drawings. Note that, in each of the drawings below, to make each layer, member, and the like recognizable in terms of size, each of the layers, members, and the like are not to scale.

Outline of Electronic Apparatus

Figure 1:
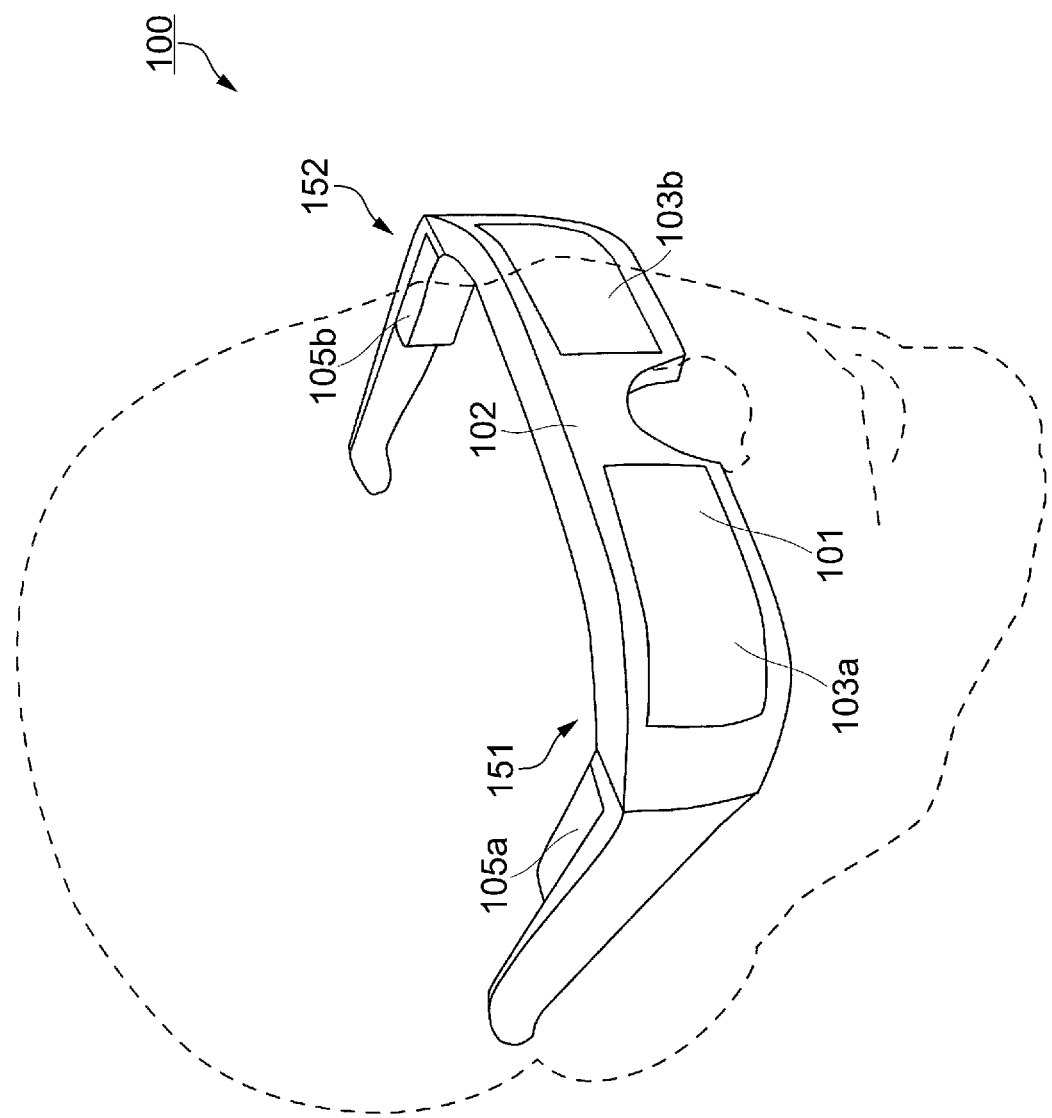
FIG. 1 is a diagram illustrating an outline of an electronic apparatus according to the present exemplary embodiment.

First, an outline of an electronic apparatus will be described with reference to FIG. 1. FIG. 1 the outline of the electronic apparatus according to is a diagram illustrating a present exemplary embodiment.

Figure 3:
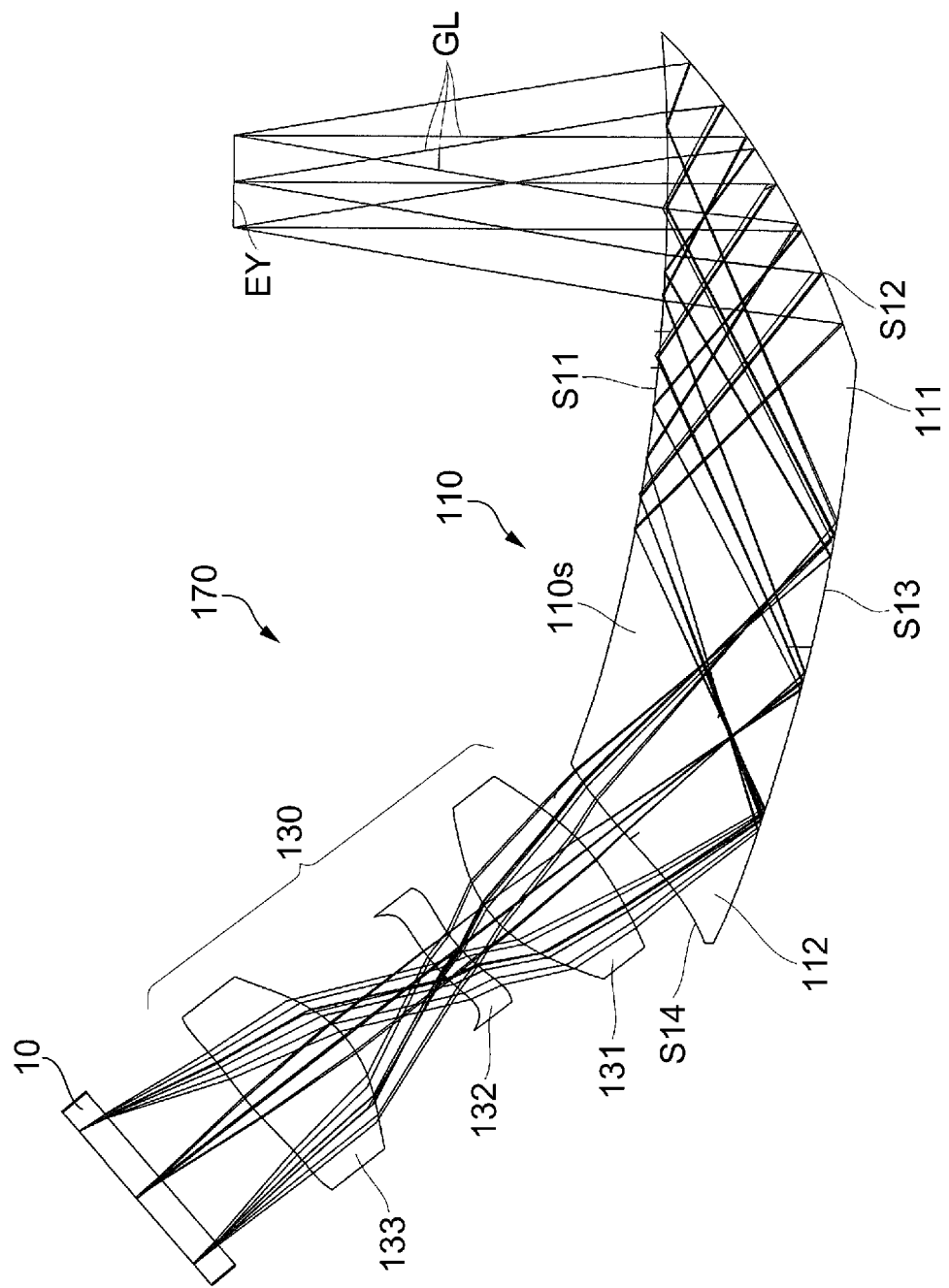
FIG. 3 is a diagram illustrating an optical system of the electronic apparatus according to the present exemplary embodiment.

A head-mounted display 100 is one example of the electronic apparatus according to the present exemplary embodiment, and includes an electro-optical device 10 (see FIG. 3). As illustrated in FIG. 1, the head-mounted display 100 has an external appearance similar to a pair of glasses. The head-mounted display 100 allows a user who wears the head-mounted display 100 to view image light GL of an image (refer to FIG. 3) and allows the user to view extraneous light as a see-through image. In other words, the head-mounted display 100 has a see-through function of superimposing the extraneous light over the image light GL to display an image, and has a small size and weight while having a wide angle of view and high performance.

The head-mounted display 100 includes a see-through member 101 that covers the front of user's eyes, a frame 102 that supports the see-through member 101, and a first built-in device unit 105a and a second built-in device unit 105b attached to respective portions of the frame 102 extending from cover portions at both left and right ends of the frame 102 over rear sidepieces (temples).

The see-through member 101 is a thick, curved optical member (transparent eye cover) that covers the front of user's eyes and is separated into a first optical portion 103a and a second optical portion 103b. A first display apparatus 151 illustrated on the left side of FIG. 1 that combines the first optical portion 103a and the first built-in device unit 105a is a portion that displays a see-through virtual image for the right eye and can alone serves as an electronic apparatus having a display function. A second display apparatus 152 illustrated on the right side of FIG. 1 that combines the second optical portion 103b and the second built-in device unit 105b is a portion that forms a see-through virtual image for the left eye and can alone serve as an electronic apparatus having a display function. The electro-optical device 10 (see FIG. 3) is incorporated in each of the first display apparatus 151 and the second display apparatus 152.

Internal Structure of Electronic Apparatus

Figure 2:
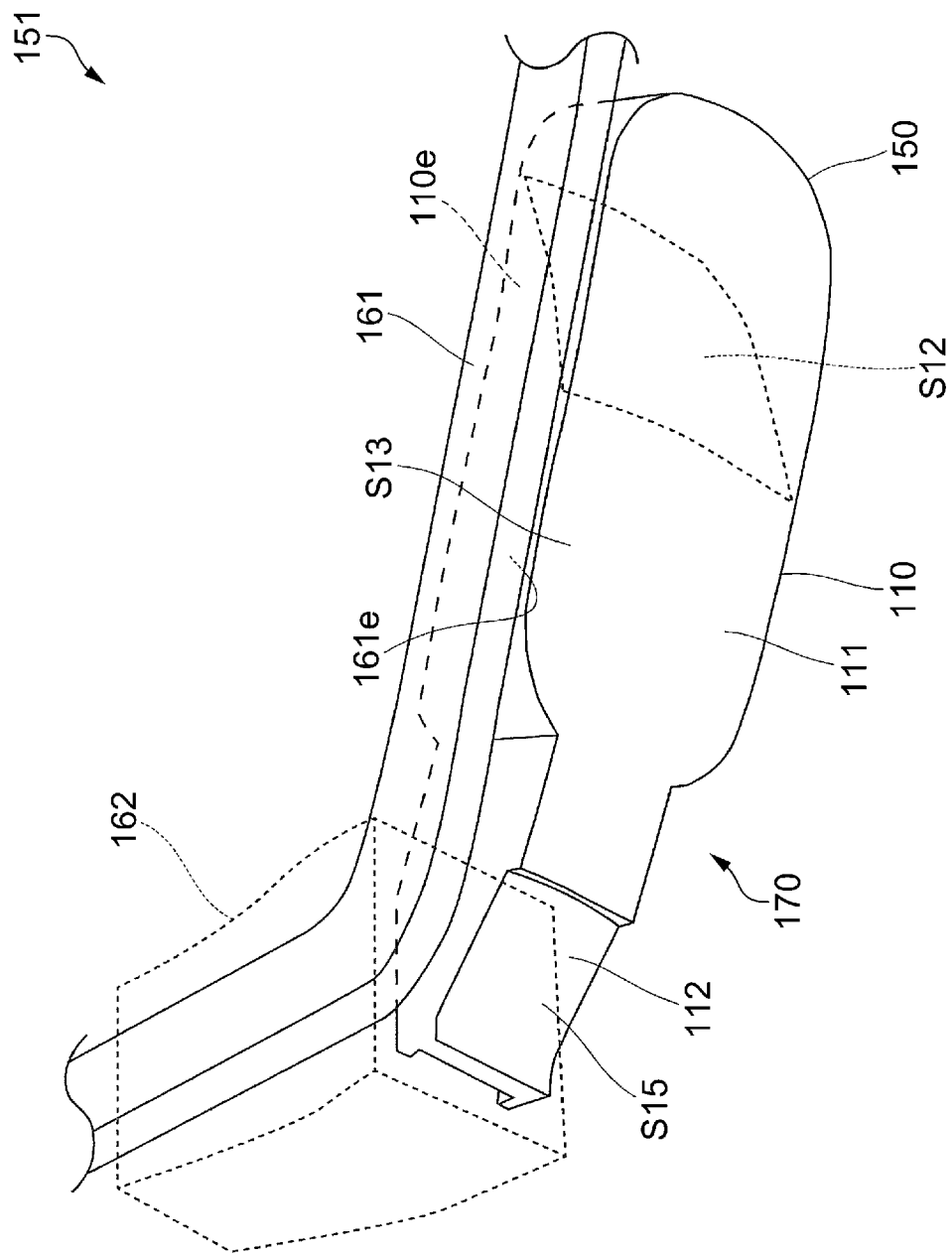
FIG. 2 is a diagram illustrating an internal structure of the electronic apparatus according to the present exemplary embodiment.

FIG. 2 is a diagram illustrating the internal structure of the electronic apparatus according to a present exemplary embodiment. FIG. 3 is a diagram illustrating an optical system of the electronic apparatus according to the present exemplary embodiment. Next, the internal structure and the optical system of the electronic apparatus will be described with reference to FIGS. 2 and 3. While FIG. 2 and FIG. 3 illustrate the first display apparatus 151 as an example of the electronic apparatus, the second display apparatus 152 is symmetrical to the first display apparatus 151 and has substantially the same structure. Accordingly, only the first display apparatus 151 will be described here and detailed description of the second display apparatus 152 will be omitted.

As illustrated in FIG. 2, the first display apparatus 151 includes a see-through projection device 170 and the electro-optical device 10 (see FIG. 3). The see-through projection device 170 includes a prism 110 to serve as a light-guiding member, a transparent member 150, and a projection lens 130 for image formation (see FIG. 3). The prism 110 and the transparent member 150 are integrated together by bonding and are securely fixed on a lower side of a frame 161 such that an upper surface 110e of the prism 110 contacts a lower surface 161e of the frame 161, for example.

The projection lens 130 is fixed to an end portion of the prism 110 through a lens tube 162 that houses the projection lens 130. The prism 110 and the transparent member 150 of the see-through projection device 170 correspond to the first optical portion 103a in FIG. 1. The projection lens 130 of the see-through projection device 170 and the electro-optical device 10 correspond to the first built-in device unit 105a in FIG. 1.

The prism 110 of the see-through projection device 170 is an arc-shaped member curved along the face in a plan view and may be considered to be separated into a first prism portion 111 on a central side close to the nose and a second prism portion 112 on a peripheral side away from the nose. The first prism portion 111 is disposed on a light emission side and includes a first surface S11 (see FIG. 3), a second surface S12, and a third surface S13 as side surfaces having an optical function.

The second prism portion 112 is disposed on a light incident side and includes a fourth surface S14 (see FIG. 3) and a fifth surface S15 as side surfaces having an optical function. Of these surfaces, the first surface S11 is adjacent to the fourth surface S14, the third surface S13 is adjacent to the fifth surface S15, and the second surface S12 is disposed between the first surface S11 and the third surface S13. Further, the prism 110 includes the upper surface 110e adjacent to the first surface S11 and the fourth surface S14.

The prism 110 is made of a resin material having high optical transparency in a visible range and is molded by, for example, pouring a thermoplastic resin in a mold, and solidifying the thermoplastic resin. While a main portion 110s (see FIG. 3) of the prism 100 is illustrated as an integrally formed member, it can be considered to be separated into the first prism portion 111 and the second prism portion 112. The first prism portion 111 can guide and emit the image light GL while also allowing for see-through of the extraneous light. The second prism portion 112 can receive and guide the image light GL.

The transparent member 150 is fixed integrally with the prism 110. The transparent member 150 is a member (auxiliary prism) that assists a see-through function of the prism 110. The transparent member 150 has high optical transparency in a visible range and is made of a resin material having substantially the same refractive index as the refractive index of the main portion 110s of the prism 110. The transparent member 150 is formed by, for example, molding a thermoplastic resin.

As illustrated in FIG. 3, the projection lens 130 includes, for example, three lenses 131, 132, and 133 along an incident side-optical axis. Each of the lenses 131, 132, and 133 is rotationally symmetric about a central axis of a light incident surface of the lens. At least one or more of the lenses 131, 132, and 133 is an aspheric lens.

The projection lens 130 allows the image light GL emitted from the electro-optical device 10 to enter the prism 110 and refocus the image on an eye EY. In other words, the projection lens 130 is a relay optical system for refocusing the image light GL emitted from each pixel of the electro-optical device 10 on the eye EY via the prism 110. The projection lens 130 is held inside the lens tube 162. The electro-optical device 10 is fixed to one end of the lens tube 162. The second prism portion 112 of the prism 110 is connected to the lens tube 162 holding the projection lens 130 and indirectly supports the projection lens 130 and the electro-optical device 10.

An electronic apparatus that is mounted on a user's head and covers the front of eyes, such as the head-mounted display 100, needs to be small and light. Further, the electro-optical device 10 used in an electronic apparatus such as the head-mounted display 100 needs to have a higher resolution (finer pixels), more grey-scales of display, and lower power consumption.

Configuration of Electro-Optical Device

Figure 4:
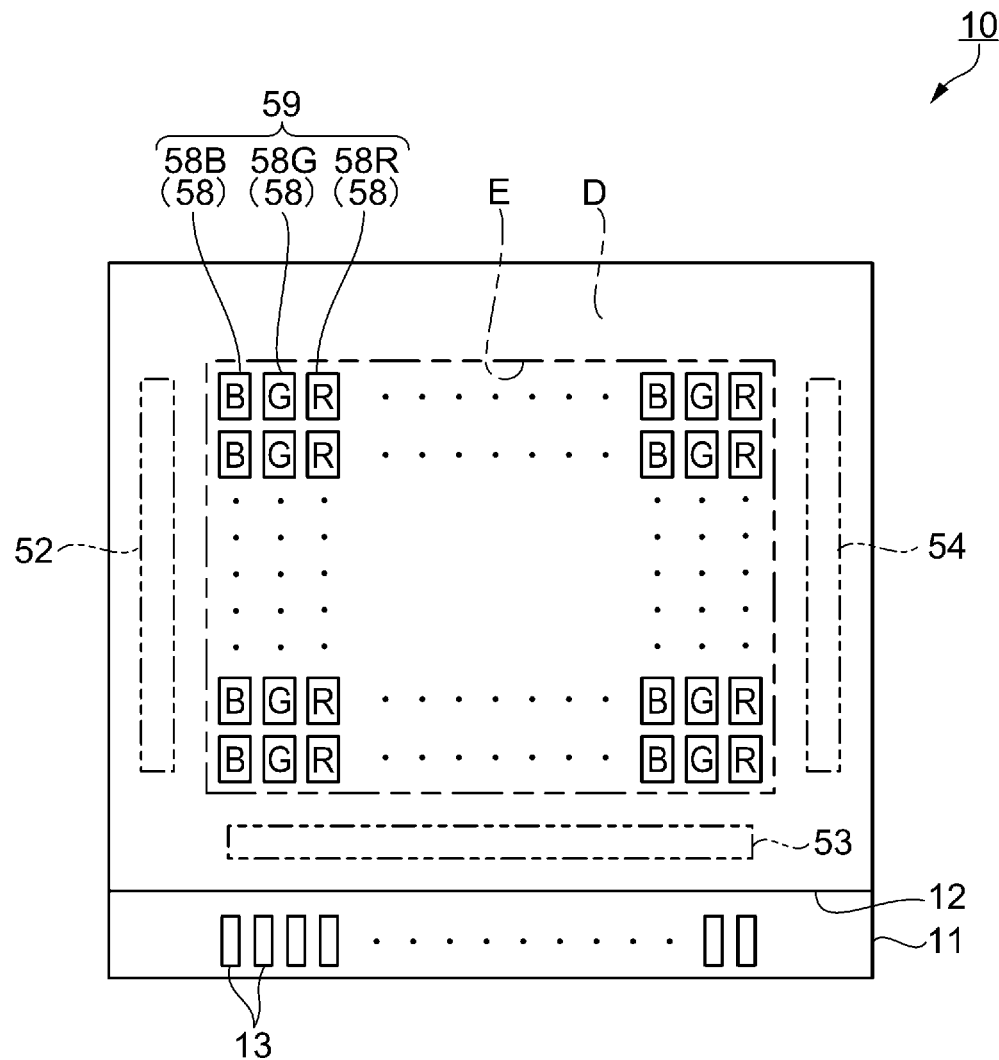
FIG. 4 is a schematic plan view illustrating a configuration of an electro-optical device according to the present exemplary embodiment.

Next, a configuration of an electro-optical device will be described with reference to FIG. 4. FIG. 4 is a schematic plan view illustrating the configuration of the electro-optical device according to the present exemplary embodiment. The present exemplary embodiment will be described by taking, as an example, a case where the electro-optical device 10 is an organic EL device including an organic EL element as a light emitting device. As illustrated in FIG. 4, the electro-optical device 10 according to the present exemplary embodiment includes a first substrate 11 and a second substrate 12. The first substrate is an element substrate and the second substrate is a protective substrate. The first substrate 11 is provided with a color filter, which is not illustrated. The first substrate 11 and the second substrate 12 are disposed to face each other and bonded together with a filling agent, which is not illustrated.

The first substrate 11 is, for example, a single-crystal semiconductor substrate such as a single-crystal silicon wafer. The first substrate 11 includes a display region E and a non-display region D surrounding the display region E. In the display region E, for example, a sub-pixel 58B that emits blue (B) light, a sub-pixel 58G that emits green (G) light, and a sub-pixel 58R that emits red (R) light are arranged in, for example, a matrix. Each of the sub-pixel 58B, the sub-pixel 58G, and the sub-pixel 58R is provided with a light emitting element 20 (see FIG. 6). In the electro-optical device 10, a pixel 59 including the sub-pixel 58B, the sub-pixel 58G, and the sub-pixel 58R serves as a display unit to provide a full color display.

In this specification, the sub-pixel 58B, the sub-pixel 58G, and the sub-pixel 58R may not be distinguished from one another and may be collectively referred to as a sub-pixel 58. The display region E is a region through which light emitted from the sub-pixel 58 passes and that contributes to display. The non-display region D is a region through which light emitted from the sub-pixel 58 does not pass and that does not contribute to display.

The first substrate 11 is larger than the second substrate 12 and a plurality of external connection terminals 13 are aligned along a first side of the first substrate 11 extending from the second substrate 12. A data line drive circuit 53 is provided between the plurality of external connection terminals 13 and the display region E. A scan line drive circuit 52 is provided between another second side orthogonal to the first side and the display region E. An enable line drive circuit 54 is provided between a third side that is orthogonal to the first side and opposite from the second side and the display region E.

The second substrate 12 is smaller than the first substrate 11 and is disposed so as to expose the external connection terminals 13. The second substrate 12 is a transparent substrate, and, for example, a quartz substrate, a glass substrate, and the like may be used as the second substrate 12. The second substrate 12 serves to protect the light emitting element 20 disposed in the sub-pixel 58 in the display region E from damage and is disposed to face at least the display region E.

Note that, a color filter may be provided on the light emitting element 20 in the first substrate 11 or provided on the second substrate 12. When beams of light corresponding to colors are emitted from the light emitting element 20, a color filter is not essential. The second substrate 12 is also not essential, and a protective layer that protects the light emitting element 20 may be provided instead of the second substrate 12 on the first substrate 11.

In this specification, a direction along the first side on which the external connection terminals 13 are arranged is referred to as X direction (row direction), and a direction along the other two sides (the second side and the third side) perpendicular to the first side and opposite to each other is referred to as Y direction (column direction). For example, present exemplary embodiment adopts a so-called stripe arrangement in which the sub-pixels 58 that emit the same color are arranged in the column direction (the Y direction) and the sub-pixels 58 that emit different colors are arranged in the row direction (the X direction).

Note that, the arrangement of the sub-pixels 58 in the row direction (X direction) may not be limited to the order of B, G, and R as illustrated in FIG. 4 and may be in the order of, for example, R, G, and B. The arrangement of the sub-pixels 58 is not limited to the stripe arrangement and may be a delta arrangement, a Bayer arrangement or an S-stripe arrangement. In addition, the sub-pixels 58B, the sub-pixels 58G and the sub-pixels 58R are not limited to the same shape or size.

First Exemplary Embodiment

Configuration of Circuit of Electro-Optical Device

Figure 5:
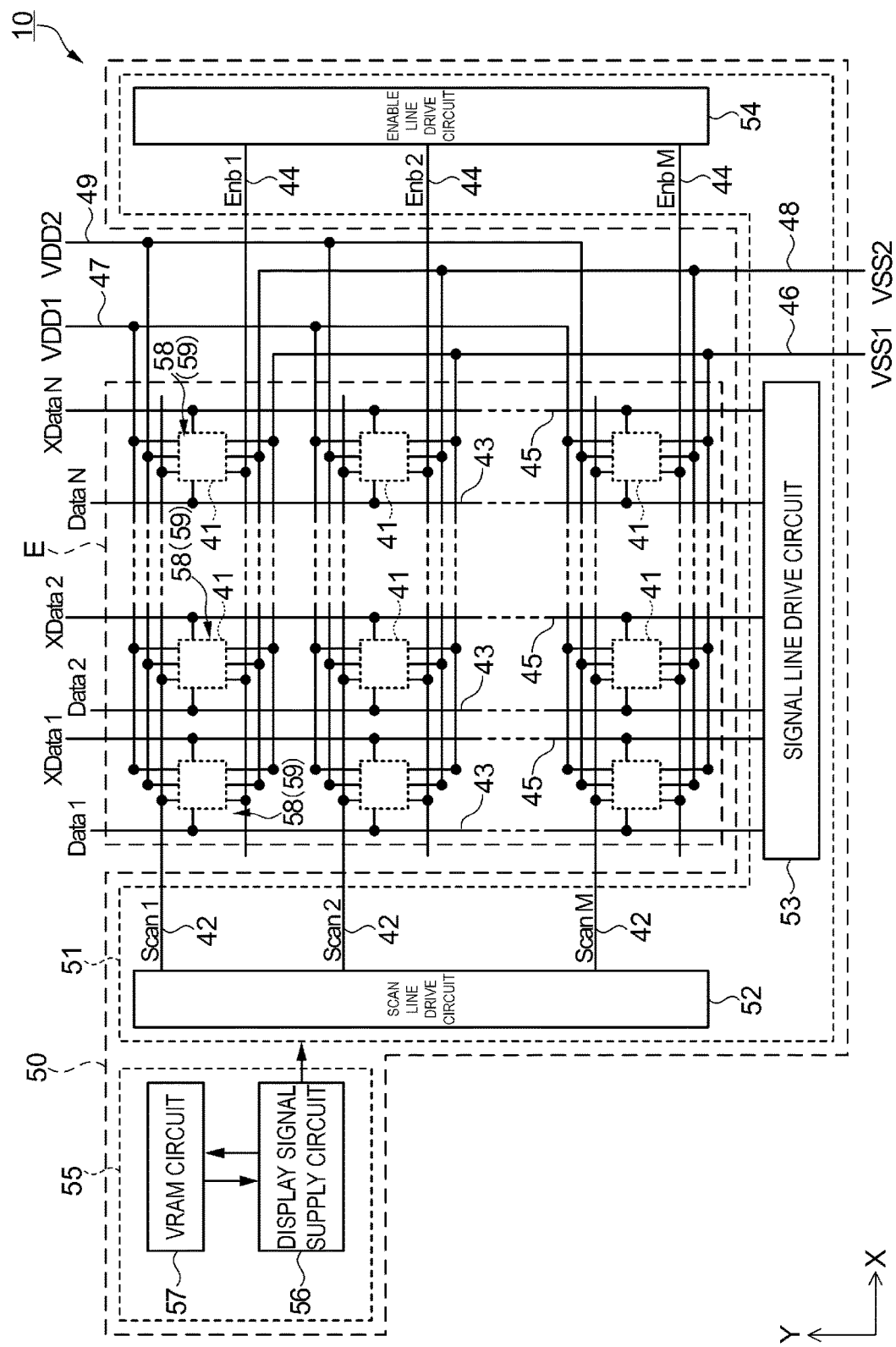
FIG. 5 is a block diagram of a circuit of the electro-optical device according to the present exemplary embodiment.

Next, a configuration of the circuit of the electro-optical device will be described with reference to FIG. 5. FIG. 5 is a block diagram of the circuit of the electro-optical device according to the present exemplary embodiment. As illustrated in FIG. 5, a plurality of scan lines 42 and a plurality of data lines 43 are formed in the display region E of the electro-optic device 10. A plurality of scan lines 42 and a plurality of data lines 43 cross each other with the sub-pixels 58 being arranged in a matrix to correspond to the respective intersections of the scan lines 42 and the data lines 43. Each of the sub-pixels 58 includes a pixel circuit 41 that possesses the light emitting element 20, a first transistor 31 (see FIG. 8), and the like.

An enable line 44 is formed in the display region E of the electro-optical device 10, corresponding to each of the scan lines 42. The scan line 42 and the enable line 44 extend in the row direction, i.e. X direction. Further, a complementary data line 45 is formed in the display region E, corresponding to each of the data lines 43. The data line 43 and the complementary data line 45 extend in the column direction, i.e. Y direction.

In the electro-optical device 10, the sub-pixels 58 in M rows×N columns are arranged in matrix in the display region E. Specifically, M scan lines 42, M enable lines 44, N data lines 43, and N complementary data lines 45 are formed in the display region E. Note that, M and N are integers of two or more. In the present exemplary embodiment M=720 and N=1280×p as an example, where p is an integer of one or more and indicates the number of basic display colors. The present exemplary embodiment is described by taking, as an example, a case where p=3, that is, the basic display colors are three colors of R, G, and B.

The electro-optical device 10 includes a driving unit 50 outside the display region E. The driving unit 50 supplies various signals to the respective pixel circuits 41 arranged in the display region E, such that a pixel 59, which consists of three-colored sub-pixels 58, serves as a display unit for displaying an image in the display region E. The driving unit 50 includes a drive circuit 51 and a control device 55. The control device 55 supplies a display signal to the drive circuit 51. The drive circuit 51 supplies a drive signal, which is based on the display signal, to each of the pixel circuits 41 through the plurality of scan lines 42, the plurality of data lines 43, and the plurality of enable lines 44.

Further arranged in the non-display region D and the display region E are first high potential lines 47, first low potential lines 46, second high potential lines 49 and second low potential lines 48. The first high potential lines 47 work as first potential lines to which a first potential is supplied. The first low potential lines 46 work as second potential lines to which a second potential is supplied. The second high potential lines 49 work as a third potential lines to which a third potential is supplied. The second low potential lines 48 work as fourth potential lines to which a fourth potential is supplied. In the first exemplary embodiment, to each of the pixel circuits 41, the first high potential line 47 supplies the first potential, the first low potential line 46 supplies the second potential, the second high potential line 49 supplies the third potential, and the second low potential line 48 supplies the fourth potential.

In the first exemplary embodiment, the second potential is lower than the first potential. The first potential V1 is VDD1, e.g. V1=VDD1=3.25 V, and the second potential V2 is VSS1, e.g. V2=VSS1=0.25 V. Further, the fourth potential is lower than the third potential. The third potential V3 is VDD2, e.g. V3=VDD2=7 V, and the fourth potential V4 is VSS2, e.g. V4=VSS2=0 V. In the present exemplary embodiment, the first potential (VDD1) and the second potential (VSS1) constitute a low-voltage power whereas the third potential (VDD2) and the fourth potential (VSS2) constitute a high-voltage power.

Note that, in one example of the present exemplary embodiment, while the first high potential lines 47, the first low potential lines 46, the second high potential lines 49, and the second low potential lines 48 extend in the row direction within the display region E, these lines may extend in the column direction, or some of the lines may extend in the row direction with the others extending in the column direction, or the lines may be arranged in a grid pattern in both the row and column directions.

The drive circuit 51 includes the scan line drive circuit 52, the data line drive circuit 53, and the enable line drive circuit 54. The drive circuit 51 is provided in the non-display region D (see FIG. 4). In the present exemplary embodiment, the drive circuit 51 and the pixel circuit 41 are formed on the first substrate 11 that is a single-crystal silicon wafer and illustrated in FIG. 4 in the present exemplary embodiment. Specifically, both the drive circuit 51 and the pixel circuit 41 are formed from some elements that include a transistor formed on the single-crystal silicon wafer.

The scan lines 42 are electrically connected to the scan line drive circuit 52. The scan line drive circuit 52 outputs a scan signal (Scan) that allows the pixel circuits 41 to be selected or unselected in the row direction to respective scan lines 42, and the scan lines 42 transmit the scan signals to the pixel circuits 41. In other words, the scan signal has a selection state and a non-selection state, and the scan lines 42 may be appropriately selected in response to the scan signals received from the scan line drive circuits 52.

As described later, in the present exemplary embodiment, both of a second transistor 32 and a second complementary transistor 38 are N-type (see FIG. 8) and thus the selection signal, i.e. the scan signal in the selection state, is at a high potential that is the third potential (V3=VDD2) as one example. In this way, regardless of the potential value of an image signal which is constituted by the low-voltage power, the second transistor 32 and the second complementary transistor 38 in the selection state can transfer the image signal to a memory circuit at a high speed.

The non-selection signal, i.e. the scan signal in the non-selection state, is a low potential, which is the fourth potential (V4=VSS2) as one example. In this way, regardless of the value of an image signal constituted by the low-voltage power, the second transistor 32 and the second complementary transistor 38 in the non-selection state can shut off the image signal flow between the memory circuit and the data line 43 and between the memory circuit and the complementary data line 45 respectively.

Note that, to specify a scan signal supplied to a scan line 42 in an i-th row of the M scan lines 42, the scan signal in the i-th row is designated as a Scan i. The scan line drive circuit 52 includes a shift register circuit, which is not illustrated. A signal that shifts on the shift register circuit is output as a shift output signal at each stage. The shift output signals are then used to generate scan signals that range from Scan 1 in a first row to Scan M in an M-th row.

The data lines 43 and the complementary data lines 45 are electrically connected to the data line drive circuit 53. The data line drive circuit 53 includes a shift register circuit, a decoder circuit, or a demultiplexer circuit, which is not illustrated. The data line drive circuit 53 supplies an image signal (Data) to each of the N data lines 43 and a complementary image signal (XData) to each of the N complementary data lines 45 in synchronization with the selection of the scan line 42. The image signal and the complementary image signal are each a digital signal having a potential of the first potential, e.g. VDD1 in the present exemplary embodiment, or the second potential, e.g. VSS1 in the present exemplary embodiment.

Note that, to specify an image signal supplied to a data line 43 in a j-th column of the N data lines 43, the image signal in the j-th column is designated as Data j. Similarly, to specify a complementary image signal supplied to a complementary data line 45 in the j-th column of the N complementary data lines 45, the complementary image signal in the j-th column is designated as XData j.

The enable lines 44 are electrically connected to the enable line drive circuit 54. The enable line drive circuit 54 outputs an enable signal to each of the enable lines 44 that locate at every row. The enable signal can be unique to each row. The enable line 44 supplies this enable signal to the pixel circuit 41 in the corresponding row. The enable signal has an active state and a non-active state. The enable line 44 may be appropriately brought into the active state in response to the enable signal received from the enable line drive circuit 54.

As described later, in the present exemplary embodiment, a third transistor 33 is a P-type (see FIG. 8), and thus the active signal, i.e. enable signal in the active state, is a low potential. A preferable example of the low potential is the fourth potential V4=VSS2. Setting the active signal at the fourth potential lowers the ON-resistance of the third transistor 33. Also, the non-active signal, i.e. enable signal in the non-active state, is a high potential. A preferable example of the high potential is the third potential V3=VDD2. Setting the non-active signal at the third potential reliably turns the third transistor 33 into an OFF-state.

Note that, to specify an enable signal supplied to an enable line 44 in the i-th row of the M enable lines 44, the enable signal in the i-th row is designated as Enb i. The enable line drive circuit 54 supplies the active signal or the non-active signal to each row or simultaneously to a plurality of rows. In the present exemplary embodiment, the enable line drive circuit 54 supplies the active signal or the non-active signal simultaneously to all of the pixel circuits 41 located in the display region E through the enable lines 44.

The control device 55 includes a display signal supply circuit 56 and a video random access memory (VRAM) circuit 57. The VRAM circuit 57 temporarily stores a frame image and the like. The display signal supply circuit 56 generates a display signal such as an image signal and a clock signal from the frame image temporarily stored in the VRAM circuit 57 and supplies the display signal to the drive circuit 51.

In the present exemplary embodiment, the drive circuit 51 and the pixel circuits 41 are formed on the first substrate 11 that is a single-crystal silicon wafer in the present exemplary embodiment. Specifically, the drive circuit 51 and the pixel circuits 41 are each formed of transistor elements formed on the single-crystal silicon wafer.

The control device 55 is composed of a semiconductor integrated circuit formed on another single-crystal semiconductor wafer (not illustrated) different from the first substrate 11. A substrate on which the control device 55 is mounted is connected to the external connection terminals 13 provided on the first substrate 11 using a flexible printed circuit (FPC). A display signal is supplied from the control device 55 to the drive circuit 51 through this flexible printed circuit.

Configuration of Pixel

Figure 6:
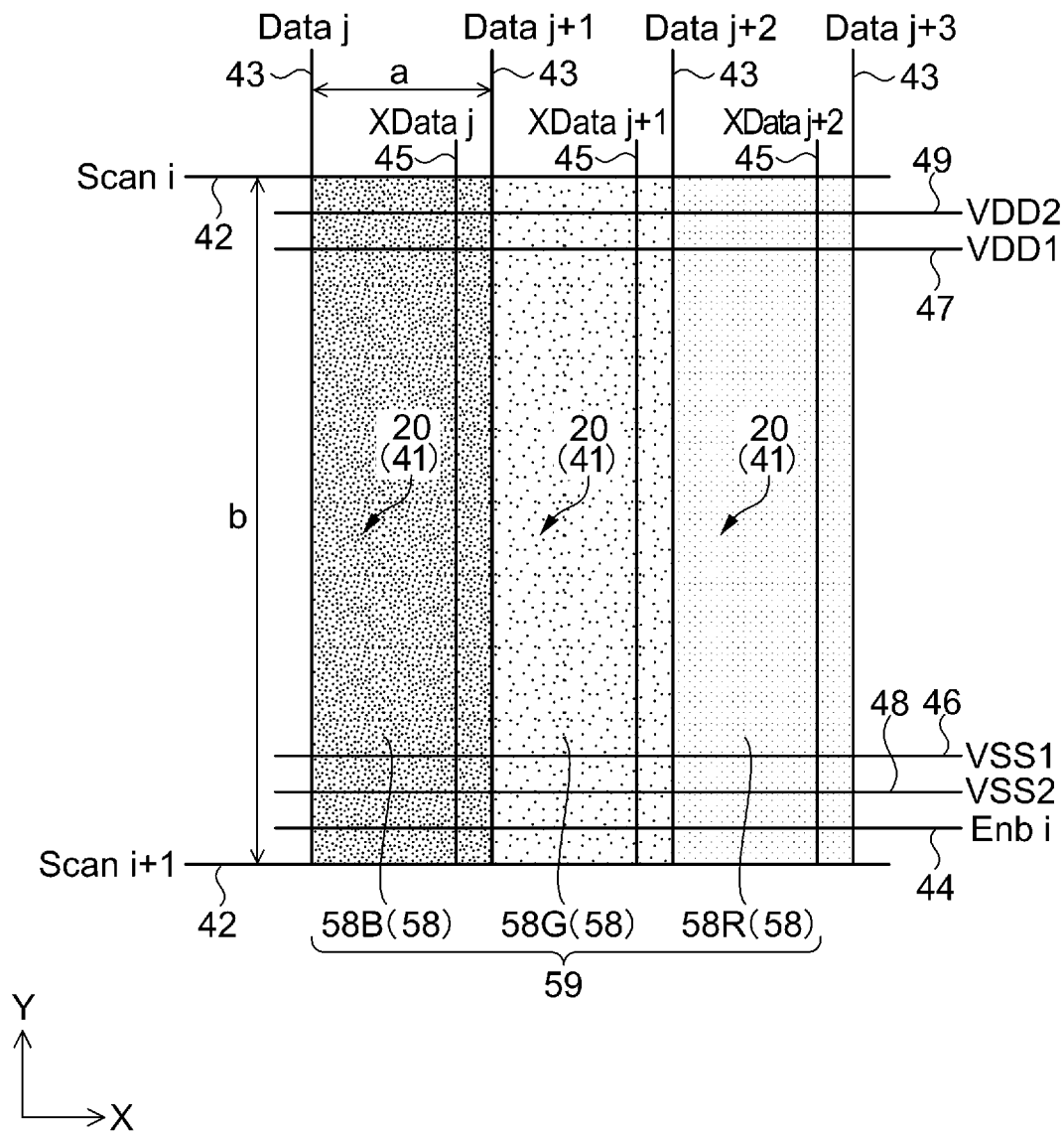
FIG. 6 is a diagram illustrating a configuration of a pixel according to the present exemplary embodiment.

Next, a configuration of a pixel according to the present exemplary embodiment will be described with reference to FIG. 6. FIG. 6 is a diagram illustrating the configuration of the pixel according to the present exemplary embodiment.

As described above, in the electro-optic device 10, the pixel 59, which includes the sub-pixels 58 such as the sub-pixel 58B, the sub-pixel 58G, and the sub-pixel 58R, works as a display unit to display an image. In the present exemplary embodiment, the length a of the sub-pixel 58 in the row direction, i.e. X direction, is 4 micrometers (μm) and the length b of the sub-pixel 58 in the column direction, i.e. Y direction, is 12 micrometers (μm). In other words, the pitch at which the sub-pixels 48 are arranged in the row direction (X direction) is 4 μm and the pitch at which the sub-pixels 48 are arranged in the column direction (Y direction) is 12 μm.

Each of the sub-pixels 58 includes the pixel circuit 41 in which the light emitting device (LED) 20 is formed. The light emitting element 20 emits white light. The electro-optical device 10 includes color filters (not illustrated) through which light emitted from the light emitting element 20 passes. The color filters correspond to p basic colors for display. In the present exemplary embodiment, the number of basic colors p=3 and the color filters of B, G, and R are disposed in the corresponding sub-pixels 58B, 58G, and 58R respectively.

In the present exemplary embodiment, an organic electro luminescence (EL) element is used as one example of the light emitting element 20. The organic EL element may have an optical resonant structure that amplifies the intensity of light having a specific wavelength. Specifically, the organic EL element may be configured such that a blue component is extracted from the white light emitted from the light emitting element 20 in the sub-pixel 58B; a green component is extracted from the white light emitted from the light emitting element 20 in the sub-pixel 58G; and a red component is extracted from the white light emitted from the light emitting element 20 in the sub-pixel 58R.

In addition to the above-described example, the number of basic colors p can be set to 4. In this case a color filter may consist of B, G, R and white, for example. The white color filter substantially means sub-pixel 58 without a color filter. In the case of p=4 another color such as yellow and cyan may be added instead of white. Furthermore, a light emitting diode element such as gallium nitride (GaN), a semiconductor laser element, and the like may be used as the light emitting element 20.

Digital Driving of Electro-Optical Device

Figure 7:
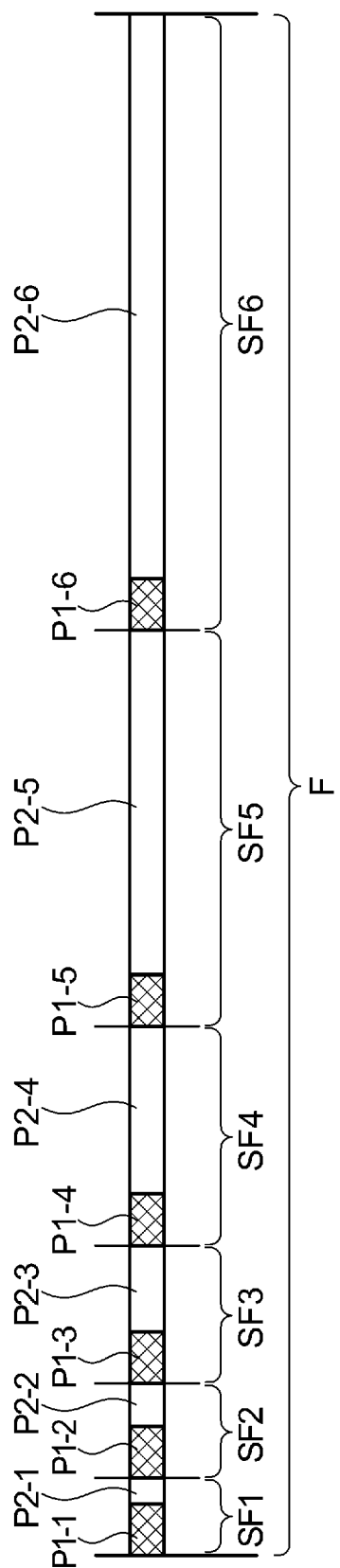
FIG. 7 is a diagram illustrating digital driving of the electro-optical device according to the present exemplary embodiment.

Next, a method for displaying an image by digital driving in the electro-optical device 10 according to the present exemplary embodiment will be described with reference to FIG. 7. FIG. 7 is a diagram illustrating the digital driving of the electro-optical device according to the present exemplary embodiment.

The electro-optical device 10 displays a image in the display region E (see FIG. 4) by digital driving. The light emitting element 20 (see FIG. 6) disposed in each of the sub-pixels 58 takes either of binary states, namely emission state (bright state) and non-emission state (dark display). The grey-scale of a displayed image is achieved by the ratio of the light emitting period at each of the light emitting devices 20. This is referred to as time division driving.

As illustrated in FIG. 7, in the time division driving, one field (F) displaying one image is divided into a plurality of subfields (SFs) and the grey-scale is expressed by controlling emission and non-emission of the light emitting element 20 in each of the subfields (SFs). A 6-bit time division driving, in which $2^6$=64 grey-scales is displayed, will be described as an example here. In the 6-bit time division driving one field F is divided into six subfields, namely SF1 to SF6.

In FIG. 7, an i-th subfield in the one field F is designated as SFi and the six subfields from the first subfield SF1 to the sixth subfield SF6 are illustrated. Each of the subfields SF includes a display period P2, i.e. P2-1 to P2-6, as a second period and, optionally, a non-display period, which is a signal-writing period, P1, i.e. P1-1 to P1-6, as a first period.

Note that, the subfields SF1 to SF6 may not be distinguished from one another and may be collectively referred to as a subfield SF, the non-display periods P1-1 to P1-6 may not be distinguished from one another and may be collectively referred to as a non-display period P1, and the display periods P2-1 to P2-6 may not be distinguished from one another and may be collectively referred to as a display period P2 in this specification.

The light emitting element 20 is either in the emission or non-emission state during the display period P2. During the non-display period (signal-writing period) P1 the light emitting element 20 is in the non-emission state. The non-display period P1 is used to write an image signal to a memory circuit 60 (see FIG. 8) or to adjust display time. When the shortest subfield, for example SF1, is relatively long, the non-display period P1 (P1-1) may be omitted.

In the 6-bit time division driving, the display period P2 (P2-1 to P2-6) of each of the subfields SFs is set such that (P2-1 in SF1):(P2-2 in SF2):(P2-3 in SF3):(P2-4 in SF4): (P2-5 in SF5):(P2-6 in SF6)=1:2:4:8:16:32. For example, if an image is displayed with a frame frequency of 30 Hz by a progressive scan method, then, one frame=one field (F)=33.3 milliseconds (msec).

In the above-described example, taking one millisecond for the non-display period P1 (P1-1 to P1-6) of each of the subfields SF, the display periods P2 are set such that P2-1 in SF1=0.434 milliseconds, P2-2 in SF2=0.868 milliseconds, P2-3 in SF3=1.735 milliseconds, P2-4 in SF4=3.471 milliseconds, P2-5 in SF5=6.942 milliseconds, and P2-6 in SF6=13.884 milliseconds.

Herein, given that the duration of the non-display period P1 is x (sec), the duration of the shortest display period P2, i.e. the display period P2-1 in the first subfield SF1 in the above-described example, is y (sec), the number of bit in grey-scale (=the number of subfields SF) is g, and the field frequency is f (Hz), then the relationship among them is expressed by Expression 1 below:

[Expression 1].

$$gx+(2^g-1)y=1/f \qquad (1)$$

In the digital driving of the electro-optical device 10, a grey-scale is displayed by the ratio of the emission period to the sum of all display periods P2 in one field F. For example, displaying black image corresponds to a grey-scale of "0", in which the light emitting element 20 is in non-emission state during all of the display periods P2-1 to P2-6 in the six subfields SF1 to SF6. On the other hand, displaying white image corresponds to a grey-scale of "63", in which the light emitting element 20 is in emission state during all of the display periods P2-1 to P2-6 in the six subfields SF1 to SF6.

To display an intermediate grey-scale of, for example, "7" out of 64 grey-scales, the light emitting element 20 emits light during the display periods P2-1, P2-2, and P2-3 of the first, second and third subfields SF1, SF2, and SF3, respectively, and the light emitting element 20 is in non-emission state during the display periods P2-4 to P2-6 of the other subfields SF4 to SF6. In this way, an intermediate grey-scale is displayed by appropriately setting the light emitting element 20 in the emission or no-emission state during the display period P2 in a field F.

According to a typical analog driven electro-optical device (organic EL device) in prior art, grey-scale is displayed by analog control of a current flowing through an organic EL element according to the gate potential of a driving transistor, such that any variation in current-voltage characteristics and threshold voltage of the drive transistor causes a variations in brightness and shift in grey-scale between pixels, resulting in a degradation of display quality. Even though a compensating circuit that compensates for variations in current-voltage characteristics and threshold voltage of a driving transistor is provided as described in JP-A-2004-062199, the compensation does not work sufficiently and a large current flows through the compensating circuit, causing an increase in power consumption.

Also in a typical organic EL device in prior art, since an analog image signal is stored in a capacitive element, a large capacitor is required in order to display many grey-scales. This requirement is a trade-off with higher resolution, which means smaller pixels. In addition, this increases large power consumption due to the charging and discharging of a large capacitor. In other words, in a typical organic EL device in prior art, an electro-optical device capable of displaying a high-resolution, multi-grey-scale, and high-quality image at low power consumption is difficult to achieve.

In the electro-optical device 10 according to the present exemplary embodiment, the light emitting element 20 is operated based on binary values of ON and OFF, so that the light emitting element 20 is either in binary states of emission or non-emission. Thus, the electro-optical device 10 is less affected by variations in current-voltage characteristics and threshold voltage of a transistor than electro-optical device in a prior art that is operated by analog driving. In other words the electro-optical device 10 according to the present exemplary embodiment displays a high-quality image, which has less variation in brightness and less shift in grey-scale between the pixels 59 (sub-pixels 58). Furthermore, since the electro-optical device 10 according to the present exemplary embodiment is driven with the digital data, it does not need a large capacitor, which is a must in analog driving of electro-optical device in a prior art. This leads a finer pixel 59 (sub-pixels 58) and a high resolution of the electro-optical device 10 according to the present exemplary embodiment. Also the electro-optical device 10 according to the present exemplary embodiment does not consume large power because it neither charge nor discharge a large capacitive element.

Furthermore, in digital driving of the electro-optical device 10 according to the present exemplary embodiment, the number of grey-scales can be easily increased by increasing g, i.e. the number of the subfields that constitute a field F. In this case, using the non-display period P1 described above, the number of grey-scales is easily increased by simply shortening the shortest display period P2. For example, simply setting the duration y of the shortest display period, i.e. P2-1 in SF1, to 0.100 millisecond by Expression 1 with the duration x of the non-display period P1=one millisecond achieves 256 grey-scales, which corresponds to g=8, at the frame frequency of f=30 Hz and in the progressive scan method.

As described later, in digital driving of the electro-optical device 10, the non-display period P1 as the first period may be assigned to a signal-writing period during which an image signal is written in the memory circuit 60 or a signal-rewriting period during which an image signal is rewritten. Thus, 6-bit grey-scale display can be easily switched to 8-bit grey-scale display without changing the signal write period. In other words 6-bit grey-scale display can be easily switched to 8-bit grey-scale display without changing the clock frequency of the drive circuit 51.

Furthermore, in digital driving of the electro-optical device 10, the image signal at the memory circuit 60 (see FIG. 8) in a sub-pixel 58 for which display is to be changed is rewritten among the subfields SF or among the fields F. On the other hand, the image signal at the memory circuit 60 in a sub-pixel 58 for which display is not to be changed is not rewritten but maintained. As a result, consuming low power, the electro-optical device 10 displays an image. Accordingly, this configuration achieves the electro-optical device 10 that displays a multi-grey-scale and high-resolution image with less variations in brightness and less shift in grey-scale between the pixels 59 (sub-pixels 58) with low energy consumption.

EXAMPLE 1

Configuration of Pixel Circuit

Figure 8:
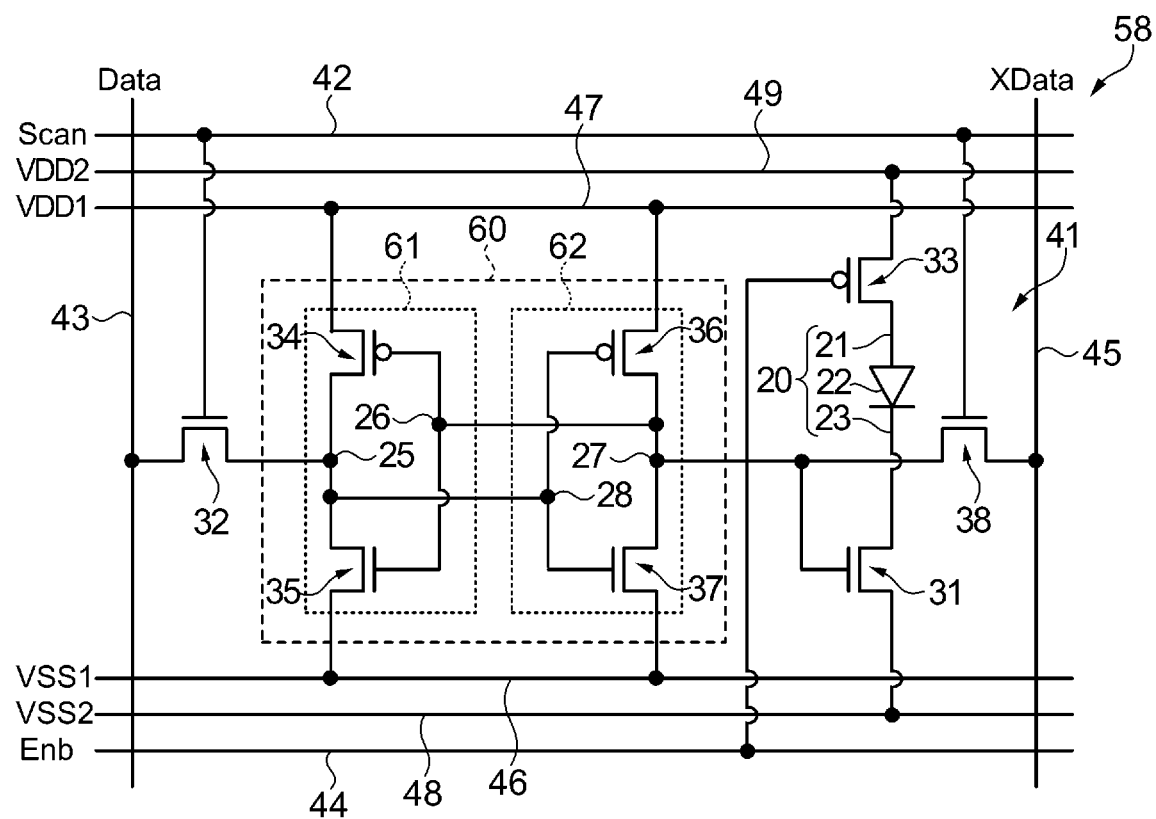
FIG. 8 is a diagram illustrating a configuration of a pixel circuit according to Example 1.

Next, a configuration of the pixel circuit according to a first exemplary embodiment will be described with Examples and Modification Examples. First, a configuration of a pixel circuit according to Example 1 of the first exemplary embodiment will be described with reference to FIG. 8. FIG. 8 is a diagram illustrating the configuration of the pixel circuit according to Example 1.

As illustrated in FIG. 8, a pixel circuit 41 is provided in each of sub-pixels 58 disposed at intersections of scan lines 42 and data lines 43. An enable line 44 is disposed along the scan line 42 and a complementary data line 45 is disposed along the data line 43. The scan line 42, the data line 43, the enable line 44, and the complementary data line 45 correspond to each of the pixel circuits 41.

In the first exemplary embodiment, i.e. Example 1 and the following Modification Examples, to each of the pixel circuits 41, a first potential (VDD1) is supplied from the first high potential line 47, a second potential (VSS1) is supplied from the first low potential line 46, a third potential (VDD2) is supplied from the second high potential line 49, and a fourth potential (VSS2) is supplied from the second low potential line 48.

The pixel circuit 41 according to Example 1 includes a first transistor 31 of N-type, a light emitting element 20, a third transistor 33 of P type, the memory circuit 60, a second transistor 32 of N-type, and a second complementary transistor 38 of N-type. The memory circuit 60 incorporated in the pixel circuit 41 enables digital driving of the electro-optical device 10 and reduces the variation in the luminance of the light emitting element 20 among the sub-pixels 58 and thus the variation in display among the pixels 59 as compared to analog driving in prior art.

The first transistor 31, the light emitting element 20, and the third transistor 33 are disposed in series between the third potential line, i.e. second high potential line 49, and the fourth potential line, i.e. second low potential line 48. The memory circuit 60 is disposed between the first potential line, i.e. first high potential line 47, and the second potential line, i.e. first low potential line 46. The second transistor 32 is disposed between the memory circuit 60 and the data line 43. The second complementary transistor 38 is disposed between the memory circuit 60 and the complementary data line 45.

The memory circuit 60 includes a first inverter 61 and a second inverter 62. The memory circuit 60 includes the two inverters 61 and 62 that are connected to each other in circle to constitute a so-called static memory that stores a digital signal that is an image signal. An output terminal 25 of the first inverter 61 is electrically connected to an input terminal 28 of the second inverter 62, and an output terminal 27 of the second inverter 62 is electrically connected to an input terminal 26 of the first inverter 61.

In this specification, the state in which terminals A and B, such as output and input terminals, are electrically connected to each other means a state in which the logic of the terminal A and the logic of the terminal B can be equal. For example, even when a transistor, a resistor, a diode, or the like is arranged between the terminals A and B, the terminals is regarded as being in an electrically connected state, if the logic of the terminal A is same as that of the terminal B. Further, "dispose/arrange/locate etc" as used in the expression "a transistor and other elements are disposed/arranged/located etc between A and B" does not mean how these elements are arranged on an actual lay-out, but means how these elements are arranged in a circuit diagram.

A digital signal stored in the memory circuit 60 has a binary value of High or Low. In the present exemplary embodiment, while the output terminal 25 of the first inverter 61 is Low, the output terminal 27 of the second inverter 62 is High and the light emitting element 20 is in a state that allows emission, whereas when the output terminal 25 of the first inverter 61 is High, the output terminal 27 of the second inverter 62 is Low and the light emitting element 20 is in a non-emission state.

In the present exemplary embodiment, the two inverters 61 and 62 constituting the memory circuit 60 are disposed between the first high potential line 47 and the first low potential line 46, and VDD1 as the first potential and VSS1 as the second potential are supplied to the two inverters 61 and 62. Therefore, High corresponds to the first potential (VDD1) whereas Low corresponds to the second potential (VSS1).

When a digital signal is stored in the memory circuit 60 and a potential of the output terminal 25 of the first inverter 61 becomes Low, Low is input to the input terminal 28 of the second inverter 62 and a potential of the output terminal 27 of the second inverter 62 becomes High. Then, High is input to the input terminal 26 of the first inverter 61 and the potential of the output terminal 25 of the first inverter 61 becomes Low. In such a manner, the digital signal stored in the memory circuit 60 is maintained in the stable state until the digital signal is rewritten next.

The first inverter 61 includes a fourth transistor 34 of P type and a fifth transistor 35 of N-type and forms a CMOS configuration. The fourth transistor 34 and the fifth transistor 35 are disposed in series between the first high potential line 47 and the first low potential line 46. A source of the fourth transistor 34 is electrically connected to the first high potential line 47. A source of the fifth transistor 35 is electrically connected to the first low potential line 46.

The second inverter 62 includes a sixth P-type transistor 36 and a seventh N-type transistor 37, and forms a CMOS configuration. The sixth transistor 36 and the seventh transistor 37 are disposed in series between the first high potential line 47 and the first low potential line 46. A source of the sixth transistor 36 is electrically connected to the first high potential line 47. A source of the seventh transistor 37 is electrically connected to the first low potential line 46.

The output terminal 25 of the first inverter 61 is a drain of the fourth transistor 34 as well as a drain of the fifth transistor 35. The output terminal 27 of the second inverter 62 is a drain of the sixth transistor 36 as well as a drain of the seventh transistor 37. The input terminal 26 of the first inverter 61 is a gate of the fourth transistor 34 as well as the fifth transistor 35, and is electrically connected to the output terminal 27 of the second inverter 62. Similarly, the input terminal 28 of the second inverter 62 is a gate of the sixth transistor 36 as well as a gate of the seventh transistor 37, and is electrically connected to the output terminal 25 of the first inverter 61.

Note that, although both of the first inverter 61 and the second inverter 62 form the CMOS configuration in the present exemplary embodiment, these inverters 61 and 62 may be formed of a transistor and a resistor. For example, one of the fourth transistor 34 and the fifth transistor 35 in the first inverter 61 may be replaced with a resistor, or one of the sixth transistor 36 and the seventh transistor 37 in the second inverter 62 may be replaced with a resistor.

The light emitting element 20 is an organic EL element in the present exemplary embodiment. It possesses an anode 21, i.e. pixel electrode, a light emitting unit 22, i.e. light emission functional layer, and a cathode 23, i.e. counter electrode. The light emitting unit 22 is configured to emit light by a part of energy being radiated as fluorescence or phosphorescence when an exciton disappears. The light emitting unit 22 emits light when the positive hole and the electron recombine. The exciton is formed by a positive hole injected from the anode 21 side and an electron injected from the cathode 23 side.

In the pixel circuit 41 according to Example 1, the light emitting element 20 is disposed between the first transistor 31 and the third transistor 33. The anode 21 of the light emitting element 20 is electrically connected to a drain of the third transistor 33. The cathode 23 of the light emitting element 20 is electrically connected to a drain of the first transistor 31.

The first transistor 31 is a drive transistor for the light emitting element 20. While the first transistor 31 is in the ON-state, the light emitting element 20 can emit light. The gate of the first transistor 31 is electrically connected to the output terminal 27 of the second inverter 62 in the memory circuit 60. The source of the first transistor 31 is electrically connected to the fourth potential line (second low potential line 48). The drain of the first transistor 31 is electrically connected to the light emitting element 20 (cathode 23). In other words, the first N-type transistor 31 is disposed on the low potential side with respect to the light emitting element 20.

The third transistor 33 is a control transistor that controls emission of the light emitting element 20. While the third transistor 33 is in the ON-state, the light emitting element 20 can emit light. As described later, in the present exemplary embodiment, the light emitting element 20 emits light, while an active signal is supplied to the enable line 44 so the third transistor 33 is in the ON-state, and while the output terminal 27 of the second inverter 62 has a potential corresponding to emission so the first transistor 31 is in the ON-state.

The gate of the third transistor 33 is electrically connected to the enable line 44. The source of the third transistor 33 is electrically connected to the third potential line (second high potential line 49). The drain of the third transistor 33 is electrically connected to the light emitting element 20 (anode 21). In other words, the third P-type transistor 33 is disposed on the high potential side with respect to the light emitting element 20.

Herein, a source potential is compared with a drain potential and the one having a lower potential is a source in the N-type transistor. A source potential is compared with a drain potential and the one having a higher potential is a source in the P-type transistor. The N-type transistor is disposed on the low potential side with respect to the light emitting element 20. On the other hand, the P-type transistor is disposed on the high potential side with respect to the light emitting element 20. This arrangement of the N-type transistor and P-type transistor with respect to the light emitting element 20 enables each transistor to operate in a substantially linear region (hereinafter, simply referred to as operate linearly).

In Example 1, the first N-type transistor 31 is disposed on the lower potential side than the light emitting element 20, and the third P-type transistor 33 is disposed on the higher potential side than the light emitting element 20. Therefore, the first transistor 31 and the third transistor 33 can be linearly operated, and variations in threshold voltages of the first transistor 31 and the third transistor 33 does not affect a display characteristic such as luminance of the light emitting element 20.

In other words, even when the first transistor 31 and the third transistor 33 have a small source-drain voltage, electric conductivity of the first transistor 31 and the third transistor 33 can be increased. As a result, most of a potential difference between the third potential (VDD2) and the fourth potential (VSS2) is applied to the light emitting element 20. Thus, the display characteristic is less likely to be affected by variations in the threshold voltages of the first transistor 31 and the third transistor 33, and uniformity of the luminance of the light emitting element 20 between the pixels 59 (sub-pixels 58) can be improved.

The second transistor 32 is disposed between the memory circuit 60 (the input terminal 28 of the second inverter 62=the output terminal 25 of the first inverter 61) and the data line 43. One of a source and a drain of the second N-type transistor 32 is electrically connected to the data line 43, and the other is electrically connected to the memory circuit 60 (the input terminal 28 of the second inverter 62), namely, gates of the sixth transistor 36 and the seventh transistor 37 (drains of the fourth transistor 34 and the fifth transistor 35). The gate of the second transistor 32 is electrically connected to the scan line 42.

The second complementary transistor 38 is disposed between the memory circuit 60 (the input terminal 26 of the first inverter 61=the output terminal 27 of the second inverter 62) and the complementary data line 45. One of a source and a drain of the second N-type complementary transistor 38 is electrically connected to the complementary data line 45, and the other is electrically connected to the memory circuit 60 (the input terminal 26 of the first inverter 61), namely, gates of the fourth transistor 34 and the fifth transistor 35 (drains of the sixth transistor 36 and the seventh transistor 37). The gate of the second complementary transistor 38 is electrically connected to the scan line 42.

The electro-optical device 10 according to the present exemplary embodiment includes the plurality of complementary data lines 45 in the display region E (see FIG. 5). One data line 43 and one complementary data line 45 correspond to one pixel circuit 41. Signals complementary to each other are supplied to the data line 43 and the complementary data line 45 paired up with the data line 43 for one pixel circuit 41. In other words, a signal (hereinafter referred to as a reverse signal) having a polarity reverse to a polarity of a signal supplied to the data line 43 is supplied to the complementary data line 45. For example, when High is supplied to the data line 43, Low is supplied to the complementary data line 45 paired up with the data line 43. When Low is supplied to the data line 43, High is supplied to the complementary data line 45 paired up with the data line 43.

The second transistor 32 and the second complementary transistor 38 are selection transistors for the pixel circuit 41. The gate of the second transistor 32 and the gate of the second complementary transistor 38 are electrically connected to the scan line 42. The second transistor 32 and the second complementary transistor 38 simultaneously switch between an ON-state and an OFF-state in response to a scan signal (selection signal or non-selection signal) supplied to the scan line 42.

When the selection signal is supplied as the scan signal to the scan line 42, the second transistor 32 and the second complementary transistor 38 are selected and are both brought into the ON-state. As a result, electrical communication is established between the data line 43 and the input terminal 28 of the second inverter 62 in the memory circuit 60 and, at the same time, between the complementary data line 45 and the input terminal 26 of the first inverter 61 in the memory circuit 60.

In this way, a digital image signal is written to the input terminal 28 of the second inverter 62 from the data line 43 via the second transistor 32. Further, a reverse signal (digital complementary image signal) of a digital image signal is written to the input terminal 26 of the first inverter 61 from the complementary data line 45 via the second complementary transistor 38. As a result, the digital image signal and the digital complementary image signal are stored in the memory circuit 60.

The digital image signal and the digital complementary image signal stored in the memory circuit 60 are maintained in a stable state until the second transistor 32 and the second complementary transistor 38 are selected next and are both brought into the ON-state and the digital image signal and the digital complementary image signal are newly written from the data line 43 and the complementary data line 45, respectively.

Note that, a polarity and a size (gate length and gate width) of each transistor, a drive condition (potential when the scan signal is the selection signal), and the like may be determined to reduce an ON-resistance of the second transistor 32 to be lower than an ON-resistance of the fourth transistor 34 and an ON-resistance of the fifth transistor 35. Similarly, a polarity and a size of each transistor, a drive condition, and the like may be determined to reduce an ON-resistance of the second complementary transistor 38 to be lower than an ON-resistance of the sixth transistor 36 and an ON-resistance of the seventh transistor 37. In this way, a signal stored in the memory circuit 60 can be rewritten quickly and reliably.

The electro-optical device 10 according to the present exemplary embodiment further includes the plurality of enable lines 44 in the display region E. The gate of the third transistor 33 is electrically connected to the enable line 44. The third transistor 33 being a control transistor for the light emitting element 20 switches between the ON-state and the OFF-state in response to an enable signal (active signal or non-active signal) supplied to the enable line 44.

When the active signal is supplied as the enable signal to the enable line 44, the third transistor 33 is brought into the ON-state. When the third transistor 33 is in the ON-state, the light emitting element 20 may emit light. On the other hand, when the non-active signal is supplied as the enable signal to the enable line 44, the third transistor 33 is brought into the OFF-state. When the third transistor 33 is in the OFF-state, a stored image signal can be rewritten without causing the memory circuit 60 to malfunction. This point will be described below.

In the present exemplary embodiment, the enable line 44 and the scan line 42 are independent of each other for each of the pixel circuits 41, and thus the second transistor 32 and the third transistor 33 operate while being independent of each other. As a result, when the second transistor 32 is in the ON-state, the third transistor 33 can be always in the OFF-state.

In other words, when an image signal is written to the memory circuit 60, the second transistor 32 and the second complementary transistor 38 are brought into the ON-state after the third transistor 33 is brought into the OFF-state, and an image signal and a reverse signal of the image signal are supplied to the memory circuit 60. The third transistor 33 is in the OFF-state while the second transistor 32 is in the ON-state. Thus, the light emitting element 20 does not emit light while an image signal is written to the memory circuit 60. In this way, grey-scale by time division can be accurately expressed.

After that, when the light emitting element 20 is caused to emit light, the third transistor 33 is brought into the ON-state after the second transistor 32 and the second complementary transistor 38 are brought into the OFF-state. When the first transistor 31 is in the ON-state at this time, there is continuity in a path from the second high potential line 49 to the second low potential line 48 through the third transistor 33, the light emitting element 20, and the first transistor 31, and a current flows to the light emitting element 20.

When the third transistor 33 is in the ON-state, the second transistor 32 and the second complementary transistor 38 are in the OFF-state. Thus, an image signal and a reverse signal of the image signal are not supplied to the memory circuit 60 while the light emitting element 20 emits light. In this way, an image signal stored in the memory circuit 60 is not mistakenly rewritten, and high-quality image display without false display can be achieved.

Relationship Between Each Potential and Threshold Voltage of Transistor

As described above, in the present exemplary embodiment, the first potential (VDD1) and the second potential (VSS1) constitute the low-voltage power, and the third potential (VDD2) and the fourth potential (VSS2) constitute the high-voltage power. With such a configuration, the electro-optical device 10 that operates at a high speed and achieves bright state is achieved. This point will be described below.

In the following description, the first potential is expressed as V1, the second potential is expressed as V2, the third potential is expressed as V3, and the fourth potential is expressed as V4. In the present exemplary embodiment, the potential difference between the first potential (V1=3.25 V) and the second potential (V2=0.25 V) (V1−V2=3.0 V), which is the voltage of the low-voltage power, is smaller than the potential difference between the third potential (V3=7.0 V) and the fourth potential (V4=0 V) (V3−V4=7.0 V), which is voltage of the high-voltage power (V1−V2<V3−V4).

With each of the potentials being set as described above, the low-voltage power supplied with the first potential and the second potential causes the drive circuit 51 and the memory circuit 60 to operate, such that the drive circuit 51 and the memory circuit 60 can be operated at high speed by making transistors constituting the drive circuit 51 and the memory circuit 60 small. On the other hand, the high-voltage power supplied with the third potential and the fourth potential causes the light emitting element 20 to emit light, such that luminance of the light emitting element 20 can be increased. In other words, the configuration of the present exemplary embodiment enables each of the circuits to operate at a high speed and can achieve the electro-optical device 10 in which the light emitting element 20 emits light at high luminance to provide bright state.

The light emitting device such as an organic EL element generally requires a relatively high voltage (for example, 5 V or higher) to emit light. However, in a semiconductor device, increasing the supply voltage necessitates increasing the size (gate length L and gate width W) of transistors in order to prevent operational failures. As a result, the operation of circuits becomes slow. On the other hand, decreasing the supply voltage in order to operate circuits at high speeds leads to a decreased luminance of the light emitting device. In other words, in a typical configuration in which the supply voltage used for emission of the light emitting device and the supply voltage used to operate circuits are identical, it is difficult to achieve both high luminance emission of the light emitting device and high-speed operation of the circuits.

In contrast, the present exemplary embodiment uses a low-voltage power and a high-voltage power as the power supplies for the electro-optical device 10 and a low-voltage power as the power supply for the operation of the drive circuit 51 and the memory circuit 60. In this way, the size of each of the transistors constituting the drive circuit 51 and the memory circuit 60 can be decreased to as small as L=approximately 0.5 micrometer (μm), which is smaller than L=approximately 0.75 micrometer (μm) of the first transistor 31 and the third transistor 33, and these circuits are driven at a low voltage of V1−V2=3.0 V. This allows high speed operation of the drive circuit 51 and the memory circuit 60.

Also, the high-voltage power causes the light emitting element 20 to emit light at a high voltage of V3−V4=7.0 V, thus allowing the light emitting element 20 to emit light at high luminance. Furthermore, as will be described later, the first transistor 31 and the third transistor 33 disposed in series with the light emitting element 20 are linearly operated, such that most of high voltage of V3−V4=7.0 V can be applied to the light emitting element 20. This further increases luminance of light emitted by the light emitting element 20.

It is assumed in the present exemplary embodiment that the second potential (V2) is higher than the fourth potential (V4) (V4<V2). Since the second potential is higher than the fourth potential, the first potential (V1) higher than the second potential can be increased accordingly. The N-type first transistor 31 is placed into the ON-state when the potential of the output terminal 27 in the memory circuit 60 electrically connected to the gate of the first transistor 31 turns High.

As High is the first potential, increasing the first potential leads to a corresponding increase in the gate potential for the fourth potential that is the source potential of the first transistor 31. In other words, the gate-source voltage $V_{gs1}$ of the first transistor 31, which is the potential difference between the first potential and the fourth potential in the ON-state ($V_{gs1}$=V1−V4=3.25 V−0 V=3.25 V), can be made higher than the voltage of the low-voltage power (V1−V2=3.0 V).

Herein, if the voltage of the low-voltage power is 3V as in the present exemplary embodiment and the second potential (V2) is the same as the fourth potential (V4) that is the source potential of the drive transistor, then the gate-source voltage $V_{gs}$ of the drive transistor becomes equal to the voltage of the low-voltage power in the ON-state ($V_{gs}$=V1−V4=3.0 V−0 V=3.0 V). As a result, the gate-source voltage $V_{gs}$ becomes smaller than the gate-source voltage $V_{gs1}$ ($V_{gs1}$=3.25 V) in the ON-state of the first transistor 31 in the present exemplary embodiment.

Alternatively, if the voltage of the low-voltage power is 3V as in the present exemplary embodiment and the second potential (V2) is lower than the fourth potential (V4) that is the source potential of the transistor (for example, V2=−1.0 V), then the first potential is such that V1=3.0 V+V2=3.0 V−1.0 V=2.0 V, given that V1−V2=3.0 V, and the gate-source voltage $V_{gs}$ of the drive transistor becomes equal to the potential difference between the first potential and the fourth potential in the ON-state ($V_{gs}$=V1−V4=2.0 V−0 V=2.0 V). As a result, the gate-source voltage $V_{gs}$ becomes even smaller than the gate-source voltage $V_{gs1}$ ($V_{gs1}$=3.25 V) of the first transistor 31 in the ON-state in the present exemplary embodiment.

In other words, in the configuration of the present exemplary embodiment, increasing the second potential (V2) above the fourth potential (V4) allows the gate-source voltage $V_{gs1}$ in the ON-state of the first transistor 31 to be increased above the voltage of the low-voltage power even at a small operating voltage of the memory circuit 60 (voltage of the low-voltage power). This enables linear operation of the first transistor 31. In this way, the effect of the variation in the threshold voltage of the first transistor 31 can be decreased. In other words, this configuration of the present exemplary embodiment can achieve electro-optical device 10 that can display a high-grey-scale and high-resolution image having excellent uniformity while reducing energy consumption.

In the present exemplary embodiment, the potential difference between the second potential (V2) and the fourth potential (V4) may preferably be smaller than the threshold voltage $V_{th1}$ of the first transistor 31 (V2−V4<$V_{th1}$). When an image signal stored in the memory circuit 60 corresponds to non-emission, the potential of the output terminal 27 in the memory circuit 60 is Low. With Low being the second potential, the gate-source voltage $V_{gs1}$ of the first transistor 31 is equal to the potential difference between the second potential and the fourth potential ($V_{gs1}$=V2−V4=0.25 V−0 V=0.25 V).

If the potential difference between the second potential (V2) and the fourth potential (V4) (V2−V4=0.25 V) is smaller than the threshold voltage $V_{th1}$ of the first transistor 31 ($V_{th1}$=0.36 V as one example) (V2−V4<$V_{th1}$), then the gate-source voltage $V_{gs1}$ of the N-type first transistor 31 becomes smaller than the threshold voltage $V_{th1}$ when the potential of the output terminal 27 in the memory circuit 60 is Low. As a result, the first transistor 31 is brought into the OFF-state. Thus, the first transistor 31 can be reliably placed in the OFF-state when the image signal represents non-emission.

In the present exemplary embodiment, the potential difference between the first potential (V1) and the fourth potential (V4) is preferably greater than the threshold voltage $V_{th1}$ of the first transistor 31 ($V_{th1}$<V1−V4). When an image signal stored in the memory circuit 60 corresponds to emission, the potential of the output terminal 27 in the memory circuit 60 is High. With High being the first potential, the gate-source voltage $V_{gs1}$ of the first transistor 31 is equal to the potential difference between the first potential and the fourth potential ($V_{gs1}$=V1−V4=3.25 V−0 V=3.25 V).

If the potential difference between the first potential (V1) and the fourth potential (V4) (V1−V4=3.25 V) is greater than the threshold voltage $V_{th1}$ ($V_{th1}$=0.36 V) of the first transistor 31 ($V_{th1}$<V1−V4), the gate-source voltage $V_{gs1}$ of the N-type first transistor 31 becomes greater than the threshold voltage $V_{th1}$ when the potential of the output terminal 27 in the memory circuit 60 is High. As a result, the first transistor 31 is then brought into the ON-state. Thus, the first transistor 31 can be reliably placed in the ON-state when the image signal represents emission.

The third transistor 33 is brought into the OFF-state when supplied with a non-active signal as the enable signal from the enable line 44 electrically connected to the gate, and into the ON-state when supplied with an active signal. Since the third transistor 33 is P type in the present exemplary embodiment (Example 1), the potential of the non-active signal is provided by the third potential (VDD2) on the high potential side and the potential of the active signal is provided by the fourth potential (VSS2) on the low potential side.

When the non-active signal is supplied from the enable line 44 to the third transistor 33, both of the source potential and the gate potential of the third transistor 33 become the third potential (V3) and the gate-source voltage $V_{gs3}$ of the third transistor 33 becomes 0 V. With the threshold voltage of the P-type third transistor 33 being $V_{th3}$ ($V_{th3}$=−0.36 V as one example), the gate-source voltage $V_{gs3}$ of the third transistor 33 becomes greater than the threshold voltage $V_{th3}$ and the third transistor 33 is brought into the OFF-state. Thus, the third transistor 33 can be reliably placed in the OFF-state when the enable signal is the non-active signal.

When the active signal is supplied from the enable line 44, the gate-source voltage $V_{gs3}$ of the third transistor 33 is a potential difference (V4−V3=−7.0 V) between the fourth potential (V4) and the third potential (V3). In other words, the absolute value of the gate-source voltage $V_{gs3}$ of the third transistor 33 becomes identical to the voltage of the high-voltage power. As the gate-source voltage $V_{gs3}$ of the third transistor 33 becomes smaller than the threshold voltage $V_{th3}$, the third transistor 33 is brought into the ON-state. Thus, the third transistor 33 can be reliably placed in the ON-state when the enable signal is the active signal.

In other words, the configuration of the present exemplary embodiment can ensure that the first transistor 31 and the third transistor 33 are placed into the OFF-state when the light emitting element 20 is to be in the non-emission state to ensure non-emission state, and the first transistor 31 and the third transistor 33 are placed into the ON-state when the light emitting element 20 is to be in the emission state to ensure emission state, even with two different electrical systems of the low-voltage power and the high-voltage power.

From the above-described results, preferred relationships between each of the potentials (V1, V2, V3, and V4) and the threshold voltage ($V_{th1}$) of the first transistor 31 in the present exemplary embodiment can be derived and expressed by the following Expression 2 and Expression 3:

[Expression 2]

$$0 < V2-V4 < Vth1 < V1-V4 \quad (2)$$

[Expression 3].

$$V1-V3 < V2-V4 < Vth1 < V1-V4 \quad (3)$$

Characteristics of Transistor

Next, characteristics of a transistor provided in the electro-optical device 10 according to the present exemplary embodiment will be described. In the electro-optical device 10 according to the present exemplary embodiment, the ON-resistance of the first transistor 31 may preferably be sufficiently lower than that of the light emitting element 20. Further, the ON-resistance of the third transistor 33 may also preferably be sufficiently lower than that of the light emitting element 20.

The expression "sufficiently low" refers to a drive condition in which the first transistor 31 and the third transistor 33 operates in a linear fashion and, specifically, to a state in which the ON-resistance of the first transistor 31 and the third transistor 33 is less than or equal to 1/100, preferably less than or equal to 1/1000 of the ON-resistance of the light emitting element 20. In this way, the first transistor 31 and the third transistor 33 can be linearly operated when the light emitting element 20 emits light.

As a result, most of the potential drop occurring in the first transistor 31, the third transistor 33, and the light emitting element 20 arranged in series (namely, the potential difference between the third potential and the fourth potential, which is the voltage of the high-voltage power) applies to the light emitting element 20, such that the light emitting element 20 becomes less susceptible to variation in the threshold voltage of both of the transistors 31 and 33 during emission. In other words, such a configuration can reduce the effect of variation in the threshold voltage of the first transistor 31 and the third transistor 33 and can thus minimize the variations in brightness and shift in grey-scale between the pixels 59 (sub-pixels 58). As a result, an image display with excellent uniformity can be achieved.

This is because the potential drop across the transistors 31 and 33 can be made 1% or less of the power supply voltage with 99% of the power supply voltage being received by the light emitting element 20 by making the ON-resistance of the first transistor 31 and the third transistor 33 1/100 or less of that of the light emitting element 20. Since the potential drop across the transistors 31 and 33 can be as small as 1% or less, the effect of variation in the threshold voltage of the transistors 31 and 33 on the emission characteristic of the light emitting element 20 can be reduced.

In the present exemplary embodiment (Example 1), the series resistance of the first transistor 31 and the third transistor 33 is approximately 1/1000 of the ON-resistance of the light emitting element 20. In this case, since the light emitting element 20 receives approximately 99.9% of power supply voltage and the potential drop across the transistors 31 and 33 is approximately 0.1%, the effect of variation in the threshold voltage of the transistors 31 and 33 on the emission characteristic of the light emitting element 20 is almost negligible.

The ON-resistance of a transistor depends on the polarity, gate length, gate width, threshold voltage, gate-insulating-film thickness, and the like of the transistor. In the present exemplary embodiment, the polarity, gate length, gate width, threshold voltage, gate-insulating-film thickness, and other characteristics of both of the transistors 31 and 33 may be determined in such a way that the ON-resistance of the first transistor 31 and the third transistor 33 is sufficiently lower than the ON-resistance of the light emitting element 20. This point will be described below.

In the present exemplary embodiment, the organic EL element is used in the light emitting element 20, and the transistors such as the first transistor 31 and the third transistor 33 are formed on the first substrate 11 formed of a single-crystal silicon wafer. A current-voltage characteristic of the light emitting element 20 is roughly expressed by the following Expression 4:

[Expression 4]

$$I_{EL} = L_{EL} W_{EL} J_0 \left\{ \exp\left(\frac{V_{EL} - V_0}{V_{tm}}\right) - 1 \right\}. \quad (4)$$

In Expression 4, $I_{EL}$ is a current flowing through the light emitting element 20, $V_{EL}$ is a voltage applied to the light emitting element 20, $L_{EL}$ is the length of the light emitting element 20 in a plan view, $W_{EL}$ is the width of the light emitting element 20 in the plan view, $J_0$ is a current density coefficient of the light emitting element 20, $V_{tm}$ is a coefficient voltage (a certain voltage at a certain temperature) having a temperature dependence of the light emitting element 20, and $V_0$ is a threshold voltage of emission of the light emitting element 20.

Note that, provided that the voltage of the high-voltage power is expressed as $V_P$ and the potential drop occurring across the first transistor 31 and the third transistor 33 is expressed as $V_{ds}$, then $V_{EL} + V_{ds} = V_P$. In the present exemplary embodiment, $L_{EL}=11$ micrometers (μm), $W_{EL}=3$ micrometers (μm), $J_0=1.449$ milliamperes per square centimeters (mA/cm$^2$), $V_0=3.0$ volts (V), and $V_{tm}=0.541$ volt (V).

On the other hand, when the first transistor 31 and the third transistor 33 are expressed as an i-th transistor (i is 1 or 3), a drain current $I_{dsi}$ of the i-th transistor is expressed by the following Expression 5:

[Expression 5]

$$I_{dsi} = \frac{W_i}{L_i} \cdot \frac{\varepsilon_0 \varepsilon_{ox}}{t_{oxi}} \cdot \mu_i (V_{gsi} - V_{thi}) V_{dsi} \equiv Z_i (V_{gsi} - V_{thi}) V_{dsi}. \quad (5)$$

In Expression 5, $W_i$ is the gate width of the i-th transistor, $L_i$ is the gate length of the i-th transistor, $\vartheta_0$ is the permittivity of vacuum, $\vartheta_{ox}$ is the permittivity of a gate insulating film, $t_{oxi}$ is the thickness of the gate insulating film, $\mu_i$ is the mobility of the i-th transistor, $V_{gsi}$ is the gate voltage, $V_{dsi}$ is the drain voltage at a potential drop by the i-th transistor, and $V_{thi}$ is the threshold voltage of the i-th transistor.

In Example 1, $W_1=0.75$ micrometer (μm), $W_3=1.25$ micrometers (μm), $L_1=L_3=0.75$ micrometer (μm), $t_{ox}=20$ nanometers (nm), $\mu_1=240$ square centimeters per volt per second (cm$^2$/V·s), $\mu_3=150$ square centimeters per volt per second (cm$^2$/V·s), $V_{th1}=0.36$ V, $V_{th3}=-0.36$ V, $V_{gs1}=V1-V4=3.25$ V, and $V_{gs3}=V4-V3=-7$ V.

Note that, when the first transistor 31 and the third transistor 33 are linearly operated, the current-voltage characteristic of the light emitting element 20 approximates Expression 6 below around $V_{ds}=0$ V by using a potential drop $V_{ds}$ of both of the transistors 31 and 33.

[Expression 6]

$$I_{EL} = -kV_{ds} + I_0 \quad (6)$$

In Example 1, the coefficient k defined by Expression 6 is $k=1.39\times10^{-6}$ (Ω$^{-1}$). $I_0$ is the amount of current when all voltage $V_P$ of the high-voltage power applies to the light emitting element 20, and $I_0=7.82\times10^{-7}$ (A).

Given this, the voltage at which the light emitting element 20 emits light is a voltage that satisfies $I_{EL}=I_{ds}$ using Expressions 4 and 6. In the present exemplary embodiment, $V_P=V3-V4=7$ V, $V_{ds1}=0.0065$ V, $V_{ds3}=0.0027$ V, $V_{EL}=6.9908$ V, and $I_{EL}=I_{ds1}=I_{ds3}=7.656\times10^{-7}$ A. Upon this, the ON-resistance of the first transistor 31 was $8.354\times10^3$ Ω, the ON-resistance of the third transistor 33 was $3.491\times10^3$ Ω, and the ON-resistance of the light emitting element 20 was $9.131\times10^6$ Ω.

Therefore, the ON-resistance of the first transistor 31 was approximately 1/1100 of the ON-resistance of the light emitting element 20, which is lower than 1/1000, and the ON-resistance of the third transistor 33 was approximately 1/2600 of the ON-resistance of the light emitting element 20, which is lower than 1/1000. In this manner, most of the voltage of the high-voltage power applied to the light emitting element 20.

Under this condition, even when the threshold voltage of the transistor varies 30% or more (even when $V_{th1}$ and $V_{th3}$ varies between 0.31 V and 0.55 V in Example 1), $V_{EL}=6.99$ V and $I_{EL}=I_{ds1}=I_{ds3}=7.66\times10^{-7}$ A are invariable. Typically, the threshold voltage of the transistor does not greatly vary in such a manner. Therefore, decreasing the ON-resistance of the third transistor 33 to approximately 1/1000 or below of the ON-resistance of the light emitting element 20 substantially eliminates the effect of variation in the threshold voltage of the first transistor 31 and the third transistor 33 on the luminance of the light emitting element 20.

By simultaneously solving Expression 5 and Expression 6 with $I_{EL}=I_{dsi}$, the effect of variation in the threshold voltage of the i-th transistor on the current $I_{EL}=I_{dsi}$ can be approximated by the following Expression 7:

[Expression 7]

$$\left(1 + \frac{k}{Z_i(V_{gsi} - V_{thi})}\right) I_{EL} = I_0. \quad (7)$$

Since $I_0$ is the amount of current when all the voltage $V_P$ of the high-voltage power applies to the light emitting element 20, the gate voltage $V_{gsi}$ and $Z_i$ may be increased to cause the light emitting element 20 to emit light around the power supply voltage $V_P$ as seen from Expression 7. In other words, the luminance of the light emitting element 20 becomes less susceptible to variation in the threshold voltage of a transistor as $Z_i$ increases.

Since $k/Z_1=3.36\times10^{-2}V$ and $k/Z_3=3.22\times10^{-2}V$ have small values in Example 1, the second term on the left side of Expression 7 is $k/(Z_1(V_{gs1}-V_{th1}))=0.01$ for the first transistor 31 and $k/(Z_3(V_{gs3}-V_{th3}))=0.005$ for the third transistor 33, and is thus less than approximately 0.01 (1%). As a result, the current (luminance) that flows when the light emitting element 20 emits light is hardly affected by the threshold voltage of both of the transistors 31 and 33. In other words, the effect of variation in the threshold voltages ($V_{th1}$ and $V_{th3}$) of both of the transistors 31 and 33 on the luminance of the light emitting element 20 can be substantially eliminated by setting the value of $k/(Z_i(V_{gsi}-V_{thi}))$ to be less than approximately 0.01 (1%).

In Expression 7, k and $Z_i$ are defined by Expressions 5 and 6. Note that, since a mobility $\mu_r$ in a P-type transistor is smaller than a mobility $\mu_i$ in a N-type transistor, W ($W_3$ in the present exemplary embodiment) of P-type transistor is set to be greater than W ($W_1$ in the present exemplary embodiment) of N-type transistor and $Z_3$ of the third P-type transistor 33 is set to be substantially identical to $Z_1$ of the first N-type transistor 31.

The gate voltage $V_{gsi}$ may preferably be as high as possible in order to cause emission of the light emitting element 20 near the power supply voltage $V_P$. In the present exemplary embodiment (Example 1), the gate-source voltage $V_{gs1}$ of the first transistor 31 is increased by setting the fourth potential to be higher than the second potential (V4<V2). Then, the gate-source voltage $V_{gs3}$ of the third transistor 33 is increased by setting the potential of the enable signal (active signal) in an active state to be the fourth potential (VSS2), the lowest among the first to fourth potentials.

Method for Driving Pixel Circuit

Figure 9:
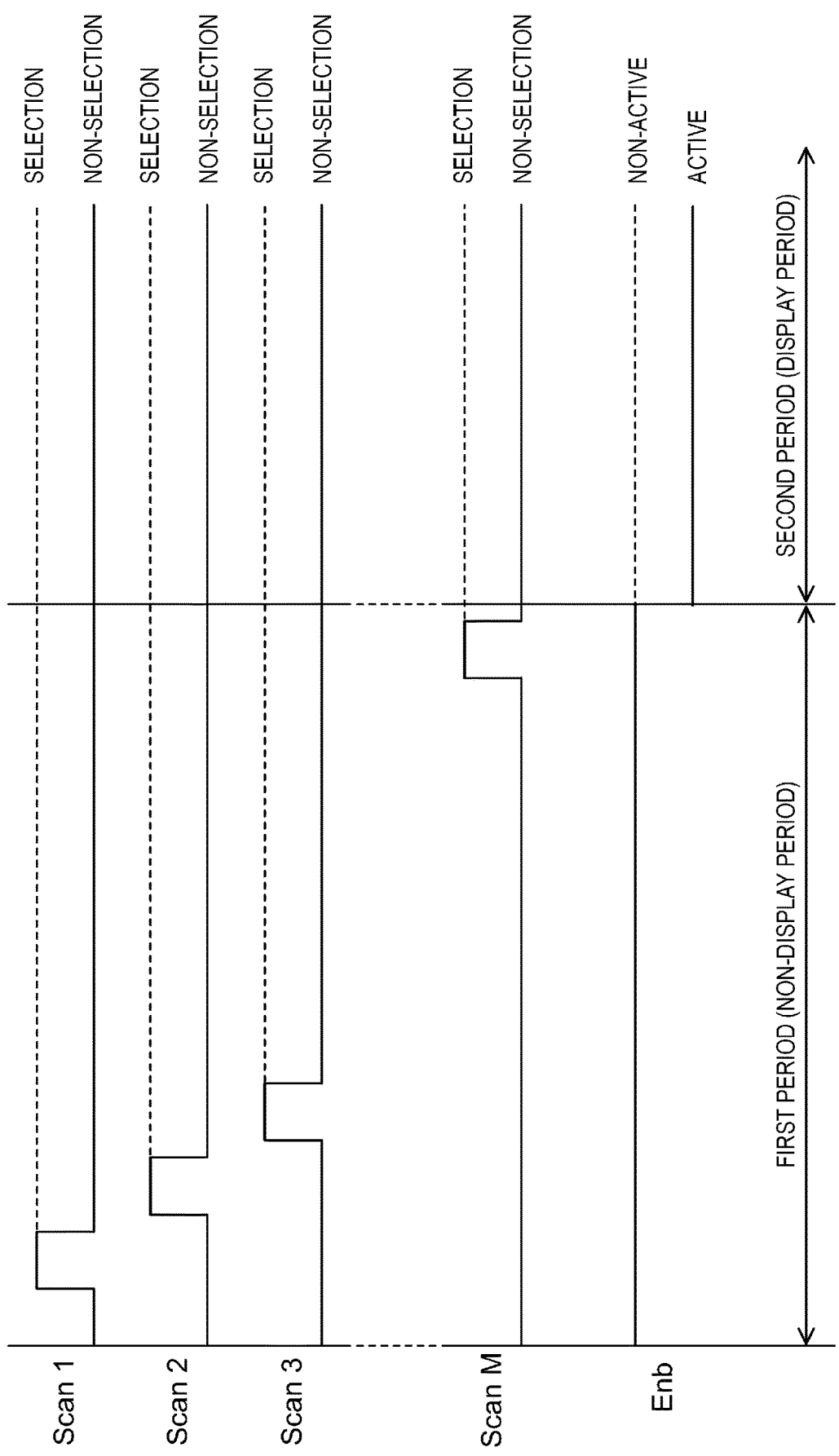
FIG. 9 is a diagram illustrating a method for driving a pixel circuit according to the present exemplary embodiment.

Next, a method for driving a pixel circuit in the electro-optical device 10 according to the present exemplary embodiment will be described with reference to FIG. 9. FIG. 9 is a diagram illustrating a method for driving a pixel circuit according to the present exemplary embodiment. In FIG. 9, the horizontal axis is a time axis and includes a first period (non-display period) and a second period (display period). The first period corresponds to P1 (P1-1 to P1-6) illustrated in FIG. 7. The second period corresponds to P2 (P2-1 to P2-6) illustrated in FIG. 7.

In the vertical axis in FIG. 9, Scan 1 to Scan M represent scan signals supplied to the respective scan lines 42 from the first row to the M-th row of the M scan lines 42 (see FIG. 5). The scan signal includes a scan signal (selection signal) in a selection state and a scan signal (non-selection signal) in a non-selection state. Enb represents an enable signal supplied to the enable line 44 (see FIG. 5). The enable signal includes an enable signal in an active state (active signal) and an enable signal in a non-active signal (non-active signal).

As described with reference to FIG. 7, one field (F) during which a single image is displayed is divided into a plurality of subfields (SFs), and each of the subfields (SFs) includes the first period (non-display period) and the second period (display period) starting after the first period ends. The first period (non-display period) is a signal-writing period during which an image signal is written to the memory circuit 60 (see FIG. 8) in each of the pixel circuits 41 (see FIG. 5) located in the display region E. The second period (display period) is a period during which the light emitting element 20 (see FIG. 8) can emit light in each of the pixel circuits 41 located in the display region E.

As illustrated in FIG. 9, in the electro-optical device 10 according to the present exemplary embodiment, a non-active signal is supplied as the enable signal to all of the enable lines 44 during the first period (non-display period). When the non-active signal is supplied to the enable lines 44, the third transistors 33 (see FIG. 8) are brought into the OFF-state, such that the light emitting devices 20 in all of the pixel circuits 41 located in the display region E are brought into a non-emission state.

During the first period, a selection signal is supplied as the scan signal to any of the scan lines 42 in each of the subfields (SFs). When the selection signal is supplied to the scan line 42, the second transistor 32 and the second complementary transistor 38 (see FIG. 8) are brought into the ON-state in the selected pixel circuit 41. In this way, an image signal is written to the memory circuit 60 from the data line 43 and the complementary data line 45 (see FIG. 8) in the selected pixel circuit 41. In this way, the image signal is written to and stored in the memory circuit 60 in each pixel circuit 41 during the first period.

During the second period (display period), an active signal is supplied as the enable signal to all of the enable lines 44. When the active signal is supplied to each enable line 44, the third transistor 33 is brought into the ON-state, thus allowing each light emitting element 20 in all of the pixel circuits 41 located in the display region E to emit light. During the second period, a non-selection signal for bringing the second transistors 32 into the OFF-state is supplied as the scan signal to all of the scan lines 42. In this way, an image signal written in the subfield (SF) is maintained in the memory circuit 60 of each of the pixel circuits 41.

As described above, the first period (non-display period) and the second period (display period) can be controlled independently in the present exemplary embodiment, such that grey-scale display by digital time division driving can be achieved. As a result, the second period can be set to be shorter than the first period, such that display with higher grey-scale can be achieved.

Furthermore, an enable signal supplied to the enable line 44 can be shared among the plurality of pixel circuits 41, such that driving of the electro-optic device 10 can be facilitated. Specifically, in a case of digital driving without the first period, highly complicated driving is required to make the emission period shorter than one vertical period within which selection of each of the plurality of scan lines 42 is completed. In contrast, an enable signal supplied to the enable line 44 is shared among the plurality of pixel circuits 41 in the present exemplary embodiment, such that the electro-optical device 10 can be easily driven by simply setting the second period to be short even when some subfields (SFs) have an emission period shorter than one vertical period in which selection of all the scan lines 42 is completed.

As described above, the configuration of the pixel circuit 41 according to the present exemplary embodiment can achieve the electro-optical device 10 that can display a high-resolution, multi-grey-scale, and high-quality image at low power consumption, while operating at a higher speed and achieving brighter display.

Hereinafter, Modification Examples of the configuration of the pixel circuit according to the first exemplary embodiment will be described. In the following description of Modification Examples, the differences from Example 1 or the above-described Modification Examples will be described. The same components as those of Example 1 or the above-described Modification Examples are designated by the same numerals in the drawings and their description will be omitted. Note that, a method for driving the pixel circuit described above is the same as the method in Example 1, and the same effects as the effects in Example 1 are also obtained from configurations in the following Modification Examples.

Modification Example 1

Configuration of Pixel Circuit

Figure 10:
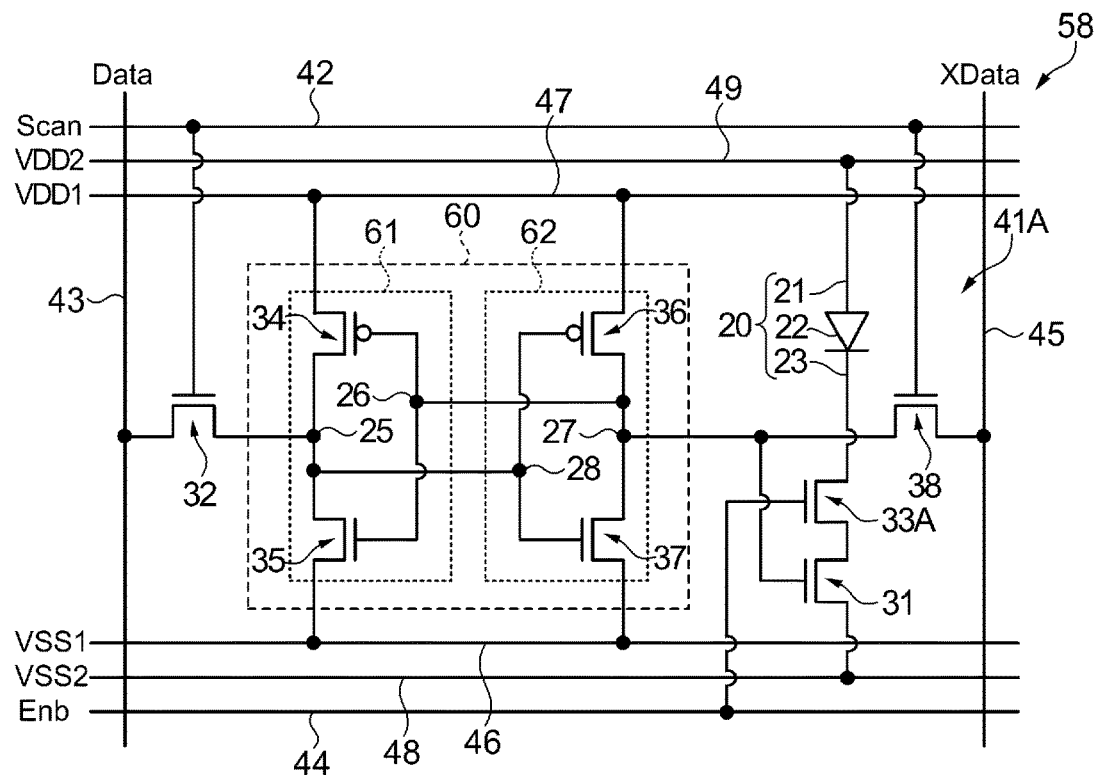
FIG. 10 is a diagram illustrating a configuration of a pixel circuit according to Modification Example 1.

First, a pixel circuit according to Modification Example 1 of the first exemplary embodiment will be described. FIG. 10 is a diagram illustrating a configuration of a pixel circuit according to Modification Example 1. As illustrated in FIG. 10, a pixel circuit 41A according to Modification Example 1 differs from the pixel circuit 41 according to Example 1 in that the third transistor 33A is an N-type transistor and is disposed between the light emitting element 20 and the first transistor 31, with the other construction being the same.

The pixel circuit 41A according to Modification Example 1 includes a light emitting element 20, a third N-type transistor 33A, a first N-type transistor 31, a memory circuit 60, a second N-type transistor 32, and a second N-type complementary transistor 38. The anode 21 of the light emitting element 20 is electrically connected to the second high potential line 49 and the cathode 23 of the light emitting element 20 is electrically connected to the drain of the third transistor 33A.

The source of the third transistor 33A is electrically connected to the drain of the first transistor 31. The source of the first transistor 31 is electrically connected to the second low potential line 48. Therefore, in the pixel circuit 41A according to Modification Example 1, the third N-type transistor 33A is disposed on the low potential side with respect to the light emitting element 20 and the first N-type transistor 31 is disposed on the low potential side with respect to the third transistor 33A.

Since the third transistor 33A is N type in Modification Example 1, the potential of the non-active signal is provided by the fourth potential (VSS2) on the low potential side and the potential of the active signal is provided by the third potential (VDD2) on the high potential side. When the active signal is supplied to the enable line 44, the gate potential of the third transistor 33A becomes the same potential as the third potential and the third transistor 33A is brought into the ON-state. With the first transistor 31 and the third transistor 33A in the ON-state, electrical communication is established through the path leading from the second high potential line 49, through the light emitting element 20, the third transistor 33A and the first transistor 31, to the second low potential line 48, allowing a current to flow to the light emitting element 20.

In Modification Example 1, the first transistor 31 is disposed between the third transistor 33A and the second low potential line 48. Thus, when the first transistor 31 is brought into the ON-state and the third transistor 33A is also brought into the ON-state, the source potential of the third transistor 33A becomes slightly higher than the fourth potential (VSS2). However, the source potential of the third transistor 33A can be made substantially equal to the fourth potential by linearly operating the first transistor 31.

Therefore, the gate-source voltage $V_{gs3}$ of the third transistor 33A becomes substantially equal to the potential difference (V3−V4=7.0 V) between the third potential (V3) and the fourth potential (V4) and becomes greater than the threshold voltage $V_{th3}$ ($V_{th3}$=0.36 V as one example) of the third N-type transistor 33A. This ensures that the third transistor 33A is in the ON-state. Then, the gate-source voltage $V_{gs3}$ of the third transistor 33A becomes sufficiently greater than the threshold voltage $V_{th3}$, allowing the third transistor 33A to operate in a linear fashion.

In this way, most of the high voltage of V3−V4=7.0 V can also apply to the light emitting element 20 in the pixel circuit 41A according to Modification Example 1. Accordingly, the luminance of the light emitting element 20 can be increased.

Characteristic of Transistor

In the pixel circuit 41A according to Modification Example 1, both of the first transistor 31 and the third transistor 33A are N-type. It is preferred that the polarity, gate length, gate width, threshold voltage, gate-insulating-film thickness and other characteristics of both of the transistors 31 and 33A in the pixel circuit 41A according to Modification Example 1 are also determined so that the ON-resistance of the first transistor 31 and the third transistor 33A is sufficiently lower than the ON-resistance of the light emitting element 20.

In Modification Example 1, $W_1$=$W_3$=0.75 micrometer (μm), $L_1$=$L_3$=0.75 micrometer (μm), $t_{ox}$=20 nanometers (nm), $\mu_1$=$\mu_3$=240 square centimeters per volt per second (cm$^2$/V·S), $V_{th1}$=$V_{th3}$=0.36 V, $V_{gs1}$=V1−($V_{ds3}$+V4)=3.25 V−$V_{ds3}$, and $V_{gs3}$=7 V−V4=7 V in Expression 5 described above.

Note that, the first transistor 31 and the third transistor 33A are also linearly operated in Modification Example 1, such that the current-voltage characteristic of the light emitting element 20 is approximated by Expression 6 described above around $V_{ds}$=0 V by using the potential drop $V_{ds}$ across the transistors 31 and 33A. Also in Modification Example 1, coefficient k defined by Expression 3 described above is k=1.39×10$^{-6}$($\Omega^{-1}$) and the amount of current $I_0$ that flows when all voltage $V_P$ of the high-voltage power applies to the light emitting element 20 is $I_0$=7.82×10$^{-7}$ (A).

Given the above condition, the voltage at which the light emitting element 20 emits light is a voltage that gives $I_{EL}$=$I_{ds}$ from Expressions 4 and 6 described above. In Modification Example 1, $V_P$=V3−V4=7V, $V_{ds1}$=0.0064 V, $V_{ds3}$=0.0028 V, $V_{EL}$=6.9908 V, and $I_{EL}$=$I_{ds1}$=$I_{ds3}$=7.655×10$^{-7}$ A. Upon this, the ON-resistance of the first transistor 31 was 8.354×10$^3$Ω, the ON-resistance of the third transistor 33A was 3.636×10$^3$Ω, and the ON-resistance of the light emitting element 20 was 9.132×10$^6$Ω.

Therefore, the ON-resistance of the first transistor 31 was approximately 1/1100 of the ON-resistance of the light emitting element 20, which is lower than 1/1000, and the ON-resistance of the third transistor 33 was approximately 1/2500 of the ON-resistance of the light emitting element 20, which is lower than 1/1000. In this manner, most of the voltage of the high-voltage power also applied to the light emitting element 20 in Modification Example 1.

Under this condition, even when the threshold voltage of the transistor varies 30% or more (even when $V_{th1}$ and $V_{th3}$ varies between 0.28 V and 0.51 V in Example 1), $V_{EL}$=6.991 V and $I_{EL}$=$I_{ds1}$=$I_{ds3}$=7.66×10$^{-7}$ A are invariable. Therefore, the effect of variation in the threshold voltage of the first transistor 31 and the third transistor 33 on the luminance of the light emitting element 20 is also substantially eliminated in Modification Example 1.

Since k/$Z_1$=k/$Z_3$=3.36×10$^{-2}$V also has a small value in Expression 7 described above in Modification Example 1, the second term on the left side of Expression 5 is k/($Z_1$ ($V_{gs1}$−$V_{th1}$))=0.01 for the first transistor 31 and k/($Z_3$ ($V_{gs3}$−$V_{th3}$))=0.005 for the third transistor 33A, and is thus less than approximately 0.01 (1%). As a result, the current (luminance) that flows when the light emitting element 20 emits light is hardly affected by the threshold voltage of both of the transistors 31 and 33A. In other words, the variation in the threshold voltages ($V_{th1}$ and $V_{th3}$) of both of the transistors 31 and 33A affecting the luminance of the light emitting element 20 can be substantially eliminated by setting a value of $k/(Z_i(V_{gsi}-V_{thi}))$ to be less than 0.01 (1%).

Also in Modification Example 1, the gate-source voltage $V_{gs1}$ of the first transistor 31 is increased by setting the second potential to be higher than the fourth potential (V4<V2), and the gate-source voltage $V_{gs3}$ of the third transistor 33A is increased by setting the potential of the enable signal (active signal) in the active state to be the third potential (VDD2), the highest among the first to fourth potentials.

Modification Example 2

Figure 11:
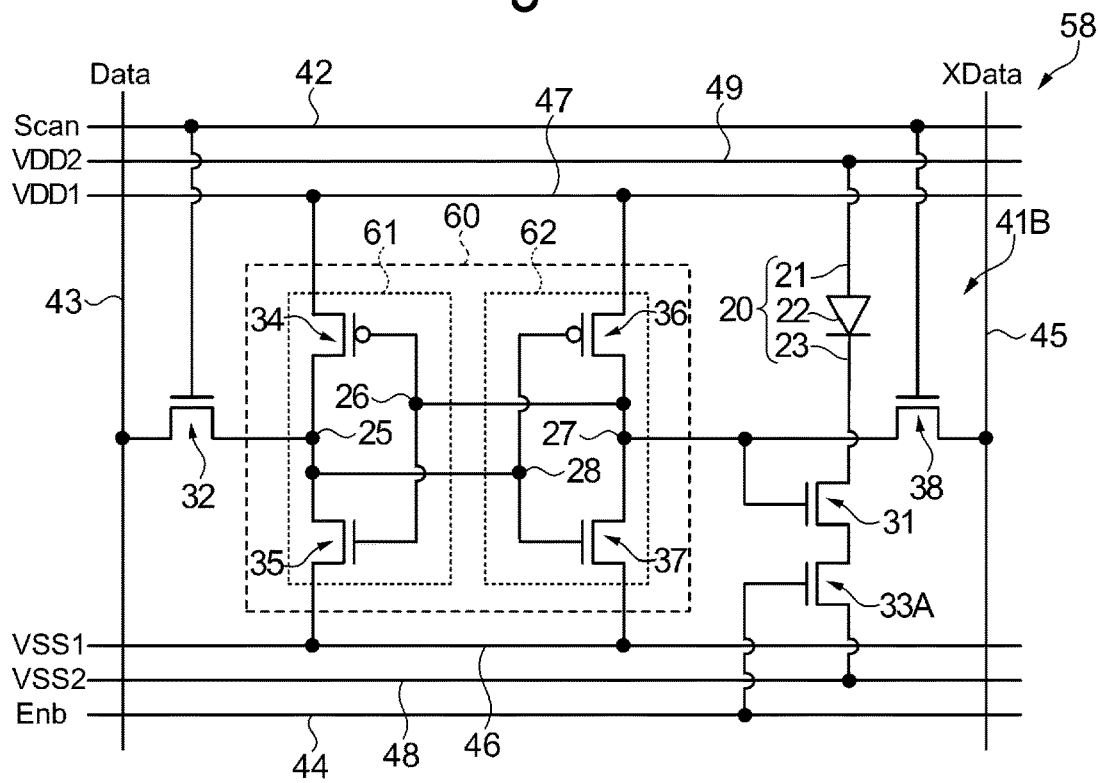
FIG. 11 is a diagram illustrating a configuration of a pixel circuit according to Modification Example 2.

Next, a pixel circuit according to Modification Example 2 of the first exemplary embodiment will be described. FIG. 11 is a diagram illustrating a configuration of the pixel circuit according to Modification Example 2. As illustrated in FIG. 11, a pixel circuit 41B according to Modification Example 2 differs from the pixel circuit 41A according to Modification Example 1 in that the first transistor 31 is disposed between the light emitting element 20 and the third transistor 33A, with the other construction being the same.

The pixel circuit 41B according to Modification Example 2 includes a light emitting element 20, a first N-type transistor 31, a third N-type transistor 33A, a memory circuit 60, a second N-type transistor 32, and a second N-type complementary transistor 38. The anode 21 of the light emitting element 20 is electrically connected to the second high potential line 49 and the cathode 23 of the light emitting element 20 is electrically connected to a drain of the first transistor 31.

The source of the first transistor 31 is electrically connected to the drain of the third transistor 33A. The source of the third transistor 33A is electrically connected to the second low potential line 48. Therefore, in the pixel circuit 41B according to Modification Example 2, the first N-type transistor 31 is disposed on the low potential side with respect to the light emitting element 20 and the third N-type transistor 33A is disposed on the low potential side with respect to the first transistor 31.

In Modification Example 2, the source of the third transistor 33A is electrically connected to the second low potential line 48. Thus, when the light emitting element 20 emits light, that is, when the active signal is supplied to the enable line 44, the gate-source voltage $V_{gs3}$ of the third transistor 33A becomes the potential difference (V3−V4=7.0 V) between the third potential (V3) and the fourth potential (V4). This ensures that the third transistor 33A is in the ON-state and operates in a linear fashion.

In Modification Example 2, the third transistor 33A is disposed between the first transistor 31 and the second low potential line 48. Thus, when the third transistor 33A is brought into the ON-state and the first transistor 31 is also brought into the ON-state, the source potential of the first transistor 31 becomes slightly higher than the fourth potential (VSS2). However, the source potential of the first transistor 31 can be made substantially equal to the fourth potential by linearly operating the third transistor 33A.

Therefore, when the potential of the output terminal 27 in the memory circuit 60 becomes High (first potential), the gate-source voltage $V_{gs1}$ of the first transistor 31 becomes substantially equal to the potential difference (V1−V4=3.25 V) between the first potential and the fourth potential and becomes greater than the threshold voltage ($V_{th1}$=0.36 V) of the first transistor 31 ($V_{th1}$<V1−V4). This ensures that the first transistor 31 is in the ON-state and operates in a linear fashion.

In this way, most of high voltage of V3−V4=7.0 V can also apply to the light emitting element 20 in the pixel circuit 41B according to Modification Example 2. Accordingly, the luminance of the light emitting element 20 can be increased.

Variation in the threshold voltages ($V_{th1}$ and $V_{th3}$) of both of the transistors 31 and 33A affecting the luminance of the light emitting element 20 can also be substantially eliminated in the pixel circuit 41B according to Modification Example 2 by determining the polarity, gate length, gate width, threshold voltage, gate-insulating-film thickness, and other characteristics of each of the transistors so that the ON-resistance of the first transistor 31 and the third transistor 33A is sufficiently lower than the ON-resistance of the light emitting element 20.

Modification Example 3

Figure 12:
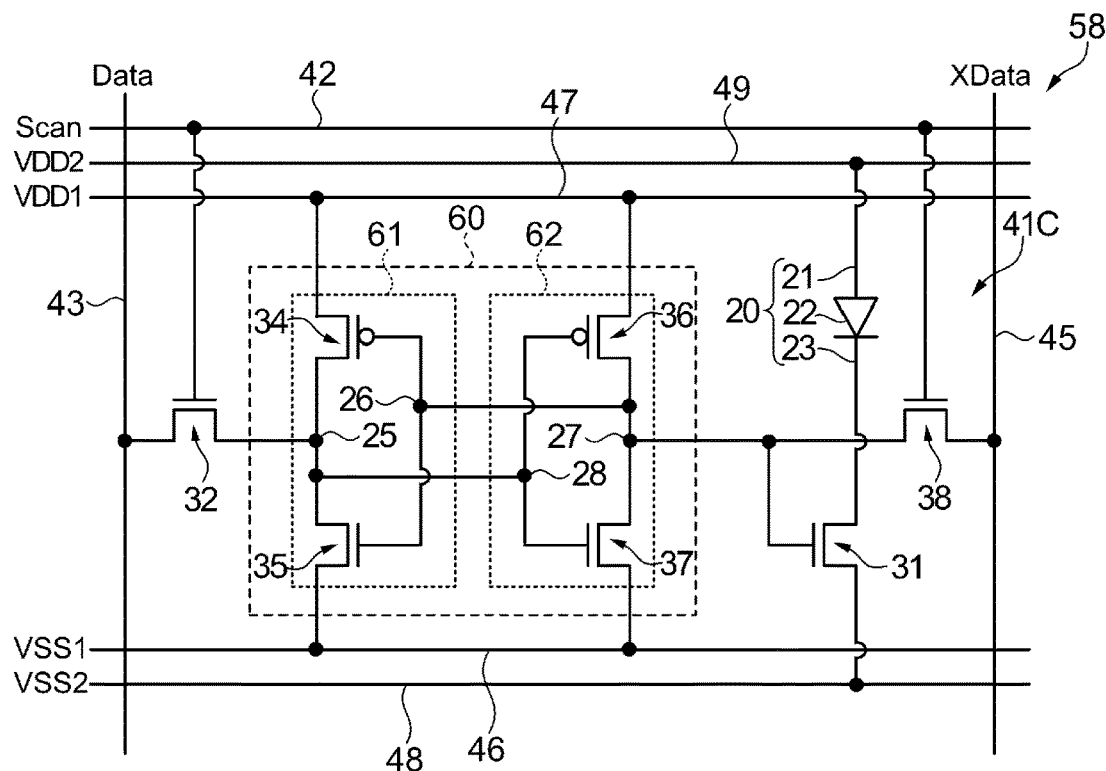
FIG. 12 is a diagram illustrating a configuration of a pixel circuit according to Modification Example 3.

Next, a pixel circuit according to Modification Example 3 of the first exemplary embodiment will be described. FIG. 12 is a diagram illustrating a configuration of the pixel circuit according to Modification Example 3. As illustrated in FIG. 12, a pixel circuit 41C according to Modification Example 3 differs from Example 1 and the modification examples described above in that the third transistor 33 (or the third transistor 33A) is not provided, with the other construction being the same.

The pixel circuit 41C according to Modification Example 3 includes a light emitting element 20, a first N-type transistor 31, a memory circuit 60, a second N-type transistor 32, and a second N-type complementary transistor 38. The anode 21 of the light emitting element 20 is electrically connected to the second high potential line 49 and the cathode 23 of the light emitting element 20 is electrically connected to the drain of the first transistor 31. The source of the first transistor 31 is electrically connected to the second low potential line 48.

The light emitting element 20 and the first transistor 31 are disposed in series between the second high potential line 49 and the second low potential line 48 in the pixel circuit 41C according to Modification Example 3. Thus, when the potential of the output terminal 27 in the memory circuit 60 becomes High (first potential) and the first transistor 31 is in the ON-state, the light emitting element 20 emits light. As with Example and Modification Examples described above, the luminance of the light emitting element 20 can also be increased and the variation in the threshold voltage $V_{th1}$ of the first transistor 31 affecting luminance of the light emitting element 20 can be substantially eliminated in Modification Example 3.

The enable line 44 is not needed in the pixel circuit 41C according to Modification Example 3, such that the number of wires and, thus, the number of wiring layers can be reduced. Since wiring layers are formed with interposed insulating layers, a large number of wiring layers may lead to an increased number of steps involved in the production process of electro-optical device (first substrate) and decreased production yields. The configuration of Modification Example 3 enables image display by digital driving even with a fewer number of wiring layers. Thus, the number of manufacturing steps can be reduced and the production yield can be improved over Example 1 and the Modification Examples described above. Further, the number of light-shielding wirings and, thus, the light-shielding area can be reduced. Thus, a higher resolution (finer pixels) can be achieved.

Second Exemplary Embodiment

Next, a configuration of an electro-optical device according to a second exemplary embodiment will be described. The electro-optical device according to the second exemplary embodiment differs from the electro-optical device 10 according to the first exemplary embodiment in that the first transistor is P type, the second potential (V2) is higher than the first potential (V1), and the fourth potential (V4) is higher than the third potential (V3). Accordingly, the configuration of the pixel circuit according to the second exemplary embodiment also differs from the configuration of the pixel circuit according to the first exemplary embodiment.

Hereinafter, the configuration of the pixel circuit according to the second exemplary embodiment will be described with reference to an example and a plurality of Modification Examples. In the following description of Examples and Modification Examples, the differences from Example 1 or Modification Examples of first embodiment will be described. The same components as those of Example 1 or Modification Examples are designated by the same numerals in the drawings and their description will be omitted.

EXAMPLE 2

Configuration of Pixel Circuit

Figure 13:
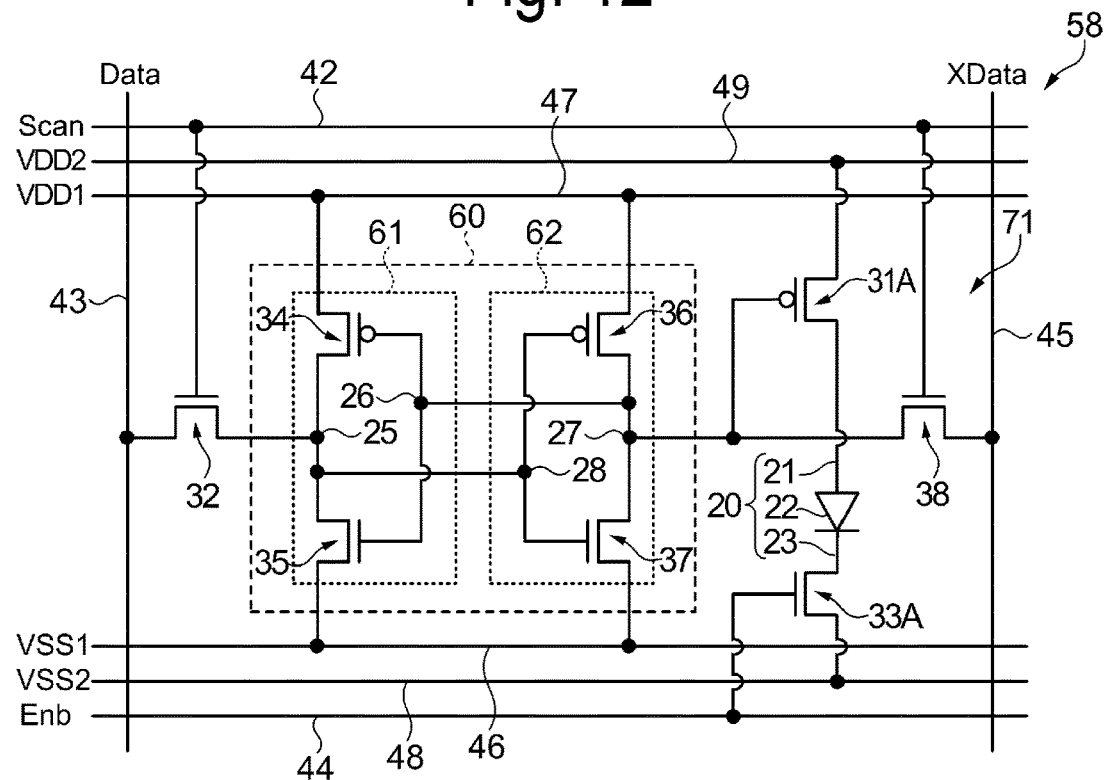
FIG. 13 is a diagram illustrating a configuration of a pixel circuit according to Example 2.

First, the configuration of the pixel circuit according to Example 2 of the second exemplary embodiment will be described with reference to FIG. 13. FIG. 13 is a diagram illustrating the configuration of the pixel circuit according to Example 2. As illustrated in FIG. 13, a pixel circuit 71 according to Example 2 includes a first P-type transistor 31A, a light emitting element 20, a third N-type transistor 33A, a memory circuit 60, a second N-type transistor 32, and a second N-type complementary transistor 38.

Note that, the high potential and the low potential are switched in the second exemplary embodiment (Example 2 and Modification Examples below) from the first exemplary embodiment. Specifically, the second potential is higher than the first potential, wherein the first potential (V1) is VSS1 (for example, VSS1=3.75 V) and the second potential (V2) is VDD1 (for example, VDD1=6.75 V). The fourth potential is higher than the third potential, wherein the third potential (V3) is VSS2 (for example, VSS2=0 V) and the fourth potential (V4) is VDD2 (for example, VDD2=7 V).

Therefore, in the second exemplary embodiment (Example 2 and the following Modification Examples), to each of the pixel circuits 71, the first potential (VSS1) is supplied from the first low potential line 46 as a first potential line, the second potential (VDD1) is supplied from the first high potential line 47 as a second potential line, the third potential (VSS2) is supplied from the second low potential line 48 as a third potential line, and the fourth potential (VDD2) is supplied from the second high potential line 49 as a fourth potential line.

In Example 2, the first transistor 31A, the light emitting element 20, and the third transistor 33A are disposed in series between the second low potential line 48 and the second high potential line 49. As with the first exemplary embodiment, the memory circuit 60 is disposed between the first low potential line 46 and the first high potential line 47. The second transistor 32 is disposed between the memory circuit 60 and the data line 43. The second complementary transistor 38 is disposed between the memory circuit 60 and the complementary data line 45.

The gate of the first transistor 31A is electrically connected to the output terminal 27 of the second inverter 62 in the memory circuit 60. The source of the first transistor 31A is electrically connected to the second high potential line 49. The drain of the first transistor 31A is electrically connected to the anode 21 of the light emitting element 20. The gate of the third transistor 33A is electrically connected to the enable line 44. The source of the third transistor 33A is electrically connected to the second low potential line 48. The drain of the third transistor 33A is electrically connected to the cathode 23 of the light emitting element 20.

In other words, the first P-type transistor 31A is disposed on the high potential side with respect to the light emitting element 20, and the third N-type transistor 33A is disposed on the low potential side with respect to the light emitting element 20 in the pixel circuit 71 according to Example 2. When the third transistor 33A and the first transistor 31A are brought into the ON-state, the light emitting element 20 may emit light. With the first transistor 31A and the third transistor 33A in the ON-state, electrical communication is established through the path leading from the second high potential line 49, through the first transistor 31A, the light emitting element 20 and the third transistor 33A, to the second low potential line 48, allowing a current to flow to the light emitting element 20.

In the second exemplary embodiment (Example 2 and the following Modification Examples), the light emitting element 20 may emit light when the potential of the output terminal 25 of the first inverter 61 in the memory circuit 60 is High (when the potential of the output terminal 27 of the second inverter 62 is Low), and the light emitting element 20 does not emit light when the potential of the output terminal 25 of the first inverter 61 is Low (when the potential of the output terminal 27 of the second inverter 62 is High).

Relationship Between Each Potential and Threshold Voltage of Transistor

Also in the second exemplary embodiment (Example 2 and the following Modification Examples), the first potential (V1) and the second potential (V2) constitute a low-voltage power, and the third potential (V3) and the fourth potential (V4) constitute a high-voltage power. The potential difference (V2−V1=6.75 V−3.75 V=3.0 V) between the second potential (V2) and the first potential (V1), which is the voltage of the low-voltage power, is smaller than the potential difference (V4−V3=7.0 V−0 V=7.0 V) between the fourth potential (V4) and the third potential (V3), which is the voltage of the high-voltage power (V2−V1<V4−V3).

Also in the second exemplary embodiment, the drive circuit 51 and the memory circuit 60 are driven by the low-voltage power at a low voltage of V2−V1=3.0 V, such that the drive circuit 51 and the memory circuit 60 can be operated at a high speed. Then, the high-voltage power causes the light emitting element 20 to emit light at a high voltage of V4−V3=7.0 V, such that the light emitting element 20 can be caused to emit light at high luminance. Furthermore, the first transistor 31A and the third transistor 33A disposed in series with the light emitting element 20 are linearly operated, such that most of high voltage of V4−V3=7.0 V can apply to the light emitting element 20. Accordingly, luminance of the light emitting element 20 can be further increased.

In the second exemplary embodiment, the two inverters 61 and 62 constituting the memory circuit 60 are disposed between the first low potential line 46 and the first high potential line 47, and VSS1 as the first potential and VDD1 as the second potential are supplied to the two inverters 61 and 62. Therefore, Low corresponds to the first potential (VSS1), and High corresponds to the second potential (VDD1).

It is assumed in the second exemplary embodiment that the second potential (V2) is lower than the fourth potential (V4) (V2<V4). The second potential is lower than the fourth potential, such that the first potential (V1) lower than the second potential can be lower accordingly. The first P-type transistor 31A is brought into the ON-state when the potential of the output terminal 27 in the memory circuit 60 electrically connected to the gate of the first transistor 31A becomes Low (first potential).

Thus, reducing the first potential reduces the gate potential for the fourth potential that is the source potential of the first transistor 31A accordingly. In other words, the gate-source voltage $V_{gs1}$ of the first transistor 31A is a potential difference ($V_{gs1}$=V1−V4=3.75 V−7.0 V=−3.25 V) between the first potential and the fourth potential, such that the absolute value of the gate-source voltage $V_{gs1}$ is greater than a voltage of the low-voltage power (V2−V1=3.0 V).

Accordingly, in the configuration of the second exemplary embodiment, decreasing the second potential (V2) below the fourth potential (V4) allows the absolute value of the gate-source voltage $V_{gs1}$ of the first transistor 31A to be increased above the voltage of the low-voltage power even at a small operating voltage of the memory circuit 60 (voltage of the low-voltage power). This enables linear operation of the first transistor 31A. In this way, the electro-optical device 10 is less affected by variation in the threshold voltage of the first transistor 31A, so that the electro-optical device 10 that displays a high-grey-scale and high-resolution image having excellent uniformity can be achieved while reducing energy consumption.

In the second exemplary embodiment, the potential difference between the second potential (V2) and the fourth potential (V4) may preferably be greater than the threshold voltage $V_{th1}$ of the first transistor 31A ($V_{th1}$<V2−V4). When the potential of the output terminal 27 in the memory circuit 60 is High (second potential) and the gate potential of the first P-type transistor 31A is the second potential, the gate-source $V_{gs1}$ is the potential difference ($V_{gs1}$=V2−V4=6.75 V−7.0 V=−0.25 V) between the second potential and the fourth potential.

Then, the gate-source voltage $V_{gs1}$ ($V_{gs1}$=−0.25 V) of the first transistor 31A becomes greater than the threshold voltage $V_{th1}$ ($V_{th1}$=−0.36 V as one example) of the first transistor 31A ($V_{th1}$<V2−V4). This ensures that the first transistor 31A is in the OFF-state. Thus, the first transistor 31A can be reliably placed in the OFF-state when the image signal represents non-emission.

Then, in the second exemplary embodiment, the potential difference between the first potential (V1) and the fourth potential (V4) may preferably be smaller than a threshold voltage $V_{th1}$ of the first transistor 31A (V1−V4<$V_{th1}$). When the potential of the output terminal 27 in the memory circuit 60 is Low (first potential) and the gate potential of the first P-type transistor 31A is the first potential, the gate-source $V_{gs1}$ is equal to the potential difference ($V_{gs1}$=V1−V4=3.75 V−7.0 V=−3.25 V) between the first potential and the fourth potential.

Then, the gate-source voltage $V_{gs1}$ ($V_{gs1}$=−3.25 V) of the first transistor 31A becomes smaller than the threshold voltage $V_{th1}$ ($V_{th1}$=−0.36 V) of the first transistor 31A. This ensures that the first transistor 31A is in the ON-state. Thus, the first transistor 31A can be reliably placed in the ON-state when the image signal represents emission. Then, the gate-source voltage $V_{gs1}$ of the first transistor 31A becomes sufficiently smaller than the threshold voltage $V_{th1}$, allowing the first transistor 31A to operate in a linear fashion.

In the second exemplary embodiment, the non-active signal is also supplied as the enable signal to all of the enable lines 44 during the first period (non-display period) and the third transistors 33A are brought into the OFF-state. As a result, the light emitting devices 20 are brought into a state of no-emission. When the selection signal is supplied as the scan signal to any of the scan lines 42 during the first period, the selected second transistor 32 and the selected second complementary transistor 38 are brought into the ON-state and an image signal is written from the data line 43 and the complementary data line 45 to the memory circuit 60.

During the second period (display period), the active signal is supplied as the enable signal to all the enable lines 44 and the third transistors 33A are brought into the ON-state, allowing the light emitting element 20 to emit light. During the second period, a non-selection signal for bringing the second transistors 32 into the OFF-state is supplied as the scan signal to all of the scan lines 42. As described above, the first period (non-display period) and the second period (display period) can also be controlled independently in the second exemplary embodiment, such that grey-scale display by digital time division driving can be achieved.

Since the third transistor 33A in the second exemplary embodiment (Example 2) is N-type, the potential of the non-active signal as the enable signal supplied from the enable lines is provided by the third potential (VSS2) on the low potential side and the potential of the active signal is provided by the fourth potential (VDD2) on the high potential side. When the non-active signal is supplied from the enable line 44, both of the source potential and the gate potential of the third transistor 33A become the third potential (V3), and the gate-source voltage $V_{gs3}$ of the third transistor 33A then becomes 0 V. With the threshold voltage of the third N-type transistor 33A being $V_{th3}$ ($V_{th3}$=0.36 V as one example), the gate-source voltage $V_{gs3}$ of the third transistor 33A becomes smaller than the threshold voltage $V_{th3}$ and the third transistor 33A is reliably brought into the OFF-state.

When the active signal is supplied from the enable line 44, the gate-source voltage $V_{gs3}$ of the third transistor 33A becomes identical to the potential difference (V4−V3=7.0 V) between the third potential (V3) and the fourth potential (V4) and becomes greater than the threshold voltage $V_{th3}$ ($V_{th3}$=0.36 V) of the third transistor 33A. This ensures that the third transistor 33A is in the ON-state. Then, the gate-source voltage $V_{gs3}$ of the third transistor 33A becomes sufficiently greater than the threshold voltage $V_{th3}$, allowing the third transistor 33A to operate in a linear fashion.

Furthermore, in the second exemplary embodiment (Example 2 and the following modification examples), the polarity, gate length, gate width, threshold voltage, gate-insulating-film thickness, and other characteristics of both of the transistors 31A and 33A (or 33) may also preferably be determined so that the ON-resistance of the first transistor 31A and the third transistor 33A (or the third transistor 33) is sufficiently lower than the ON-resistance of the light emitting element 20. Although detailed numerical values are omitted, variation in the threshold voltages ($V_{th1}$ and $V_{th3}$) of both of the transistors 31A and 33A (or 33) affecting the luminance of the light emitting element 20 can be substantially eliminated by setting a value of k/($Z_i$($V_{gsi}$−$V_{thi}$)) to be less than approximately 0.01 (1%) in Expression 7 described above.

Therefore, the configuration of the pixel circuit 71 according to Example 2 of the second exemplary embodiment can achieve the electro-optical device 10 that can display a high-resolution, multi-grey-scale, and high-quality image at low power consumption, while operating at a higher speed and achieving brighter display.

Hereinafter, modification examples of the configuration of the pixel circuit according to the second exemplary embodiment will be described. In the following description of Modification Examples, the differences from Example 1 or the above-described Modification Examples will be described. The same components as those of Example 1 or the above-described Modification Examples are designated by the same numerals in the drawings and their description will be omitted.

Modification Example 4

Figure 14:
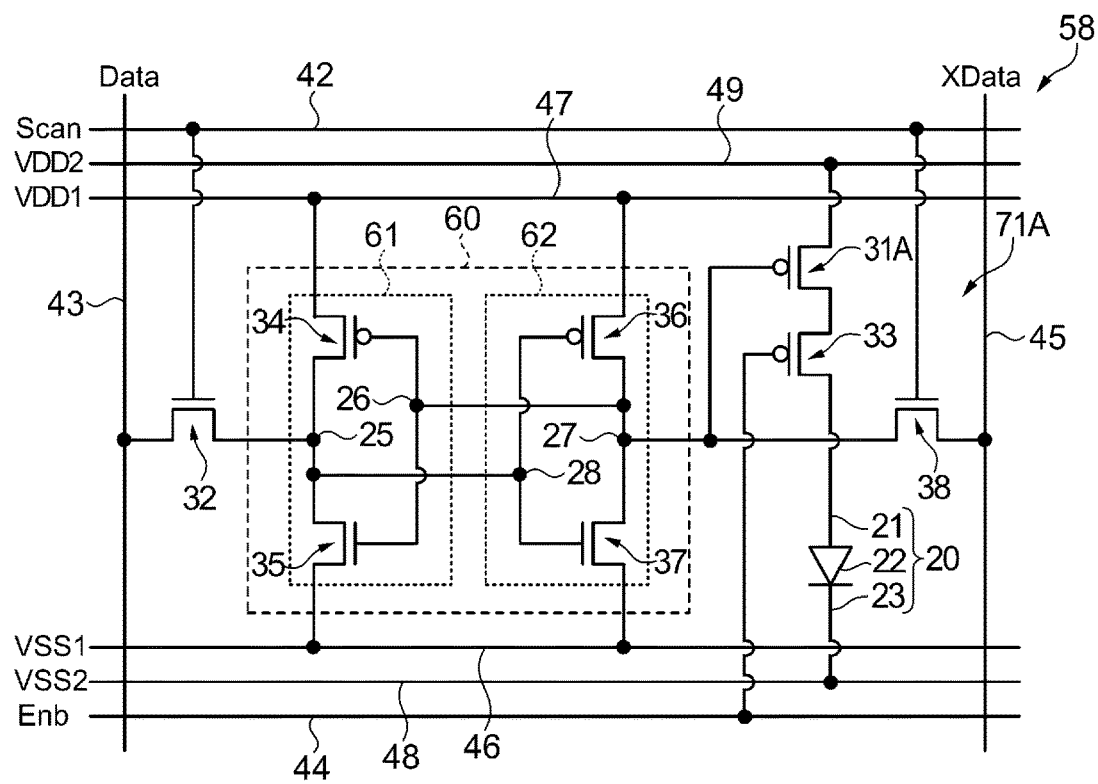
FIG. 14 is a diagram illustrating a configuration of a pixel circuit according to Modification Example 4.

First, a pixel circuit according to Modification Example 4 of the second exemplary embodiment will be described. FIG. 14 is a diagram illustrating a configuration of the pixel circuit according to Modification Example 4. As illustrated in FIG. 14, a pixel circuit 71A according to Modification Example 4 differs from the pixel circuit 71 according to Example 2 in that the third transistor 33 is P type and is disposed between the first transistor 31A and the light emitting element 20, with the other construction being the same.

The pixel circuit 71A according to Modification Example 4 includes a first P-type transistor 31A, a third P-type transistor 33, a light emitting element 20, a memory circuit 60, a second N-type transistor 32, and a second N-type complementary transistor 38. The drain of the first transistor 31A is electrically connected to the source of the third transistor 33. The drain of the third transistor 33 is electrically connected to the anode 21 of the light emitting element 20. In other words, the third P-type transistor 33 is disposed on the high potential side with respect to the light emitting element 20 and the first P-type transistor 31A is disposed on the high potential side with respect to the third transistor 33 in the pixel circuit 71A according to Modification Example 4.

Since the third transistor 33 is P type in Modification Example 4, the potential of the non-active signal is provided by the fourth potential (VDD2) on the high potential side and the potential of the active signal is provided by the third potential (VSS2) on the low potential side. When the active signal is supplied to the enable line 44, the gate potential of the third transistor 33 becomes the same potential as the third potential and the third transistor 33 is brought into the ON-state. With the first transistor 31A and the third transistor 33 in the ON-state, electrical communication is established through the path leading from the second high potential line 49, through the first transistor 31A, the third transistor 33 and the light emitting element 20, to the second low potential line 48, allowing a current to flow to the light emitting element 20.

In Modification Example 4, the first transistor 31A is disposed between the third transistor 33 and the second high potential line 49. Thus, when the third transistor 33 is brought into the ON-state, the source potential of the third transistor 33 becomes slightly lower than the fourth potential (VDD2). However, the source potential of the third transistor 33 can be made substantially equal to the fourth potential by linearly operating the first transistor 31A.

Therefore, the gate-source voltage $V_{gs3}$ of the third transistor 33 becomes substantially equal to the potential difference (V3−V4=−7.0 V) between the third potential (V3) and the fourth potential (V4) and becomes smaller than the threshold voltage $V_{th3}$ ($V_{th3}$=−0.36 V) of the third P-type transistor 33. This ensures that the third transistor 33 is in the ON-state. Then, the gate-source voltage $V_{gs3}$ of the third transistor 33 becomes sufficiently smaller than the threshold voltage $V_{th3}$, allowing the third transistor 33 to operate in a linear fashion.

Modification Example 5

Figure 15:
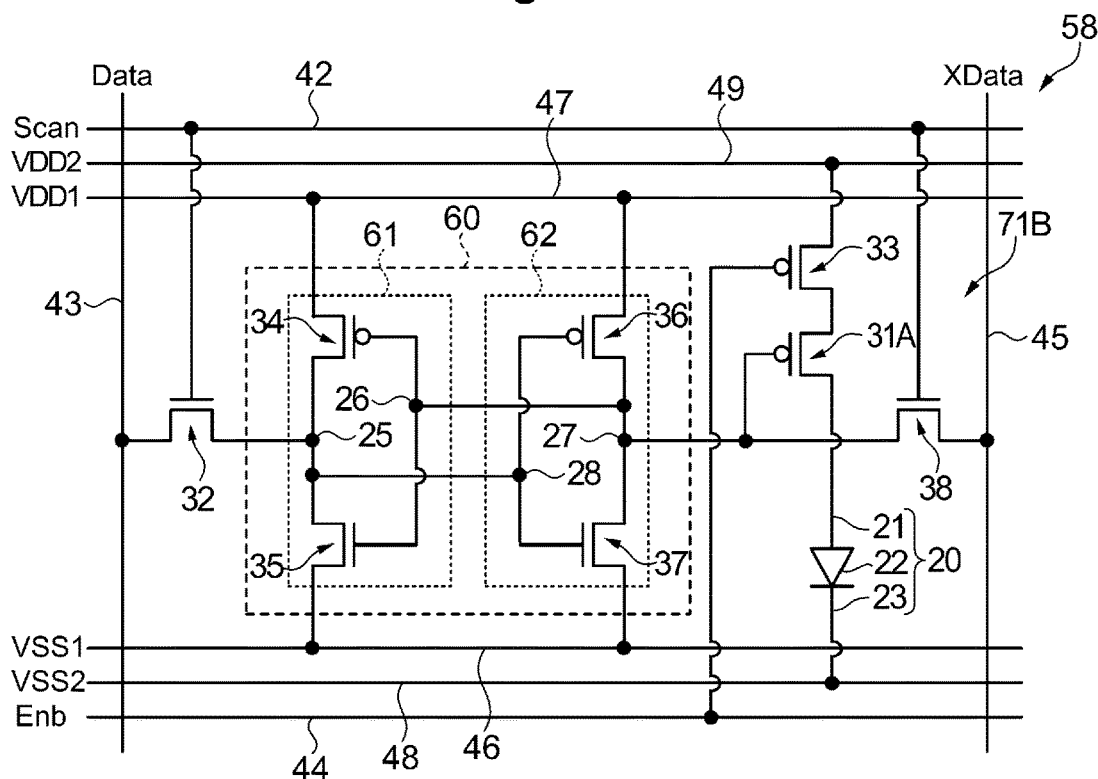
FIG. 15 is a diagram illustrating a configuration of a pixel circuit according to Modification Example 5.

Next, a pixel circuit according to Modification Example 5 of the second exemplary embodiment will be described. FIG. 15 is a diagram illustrating a configuration of the pixel circuit according to Modification Example 5. As illustrated in FIG. 15, a pixel circuit 71B according to Modification Example 5 differs from the pixel circuit 71A according to Modification Example 4 in that the first transistor 31A is disposed between the third transistor 33 and the light emitting element 20, with the other construction being the same.

The pixel circuit 71B according to Modification Example 5 includes a third P-type transistor 33, a first P-type transistor 31A, a light emitting element 20, a memory circuit 60, a second N-type transistor 32, and a second N-type complementary transistor 38. The source of the third transistor 33 is electrically connected to the second high potential line 49. The source of the first transistor 31A is electrically connected to the drain of the third transistor 33. The drain of the first transistor 31A is electrically connected to the anode 21 of the light emitting element 20. In other words, in the pixel circuit 71B according to Modification Example 5, the first P-type transistor 31A is disposed on the high potential side with respect to the light emitting element 20, and the third P-type transistor 33 is disposed on the high potential side with respect to the first transistor 31A.

In Modification Example 5, the third transistor 33 is disposed between the first transistor 31A and the second high potential line 49. Thus, when the first transistor 31A is brought into the ON-state, the source potential of the first transistor 31A becomes slightly lower than the fourth potential (VDD2). However, the source potential of the first transistor 31A can be made substantially equal to the fourth potential by linearly operating the third transistor 33. Therefore, the gate-source voltage $V_{gs1}$ of the first transistor 31A is sufficiently equal to the potential difference (V1−V4=−3.25 V) between the first potential (V1) and the fourth potential (V4). This ensures that the first transistor 31A is in the ON-state and allows it to operate in a linear fashion.

Modification Example 6

Figure 16:
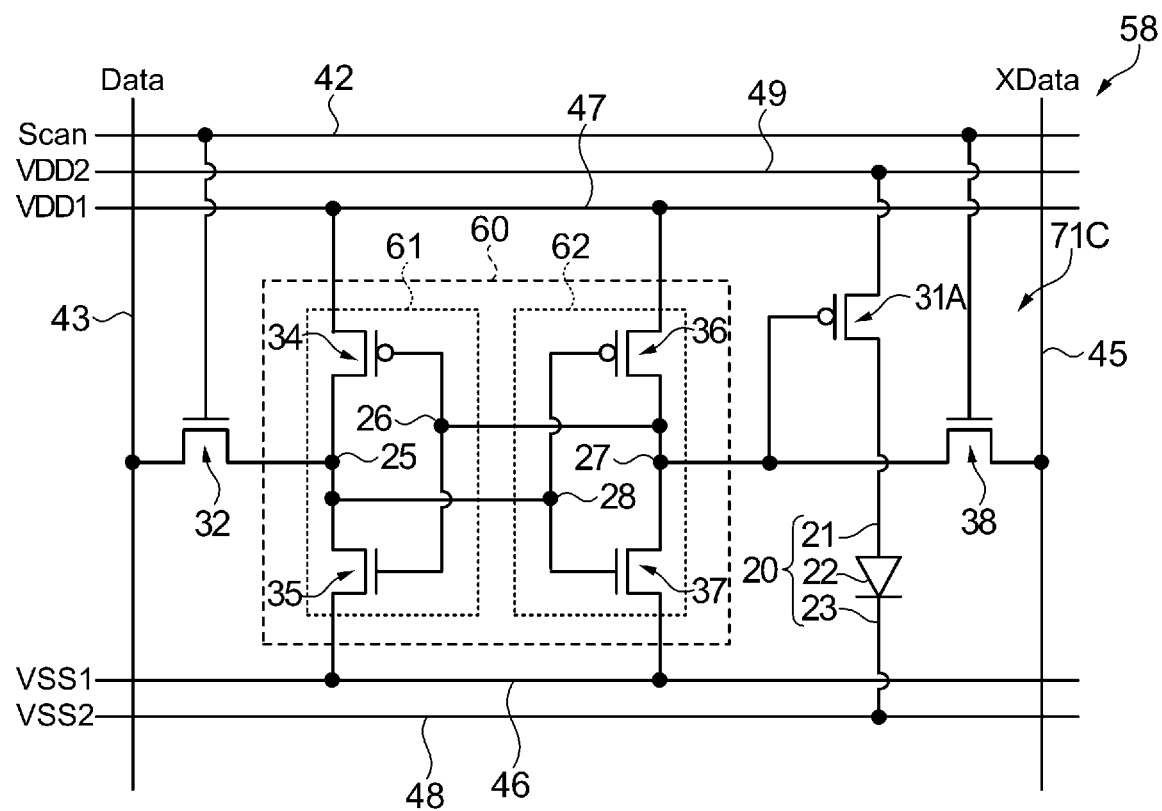
FIG. 16 is a diagram illustrating a configuration of a pixel circuit according to Modification Example 6.

Next, a pixel circuit according to Modification Example 6 of the second exemplary embodiment will be described. FIG. 16 is a diagram illustrating a configuration of the pixel circuit according to Modification Example 6. As illustrated in FIG. 16, a pixel circuit 71C according to Modification Example 6 differs from Example 2 and the modification examples described above in that the third transistor 33 (or the third transistor 33A) is not provided, with the other construction being the same.

The pixel circuit 71C according to Modification Example 6 includes a first P-type transistor 31, a light emitting element 20, a memory circuit 60, a second N-type transistor 32, and a second N-type complementary transistor 38. The source of the first transistor 31A is electrically connected to the second high potential line 49. The drain of the first transistor 31A is electrically connected to the anode 21 of the light emitting element 20. The cathode 23 of the light emitting element 20 is electrically connected to the second low potential line 48.

The first transistor 31A and the light emitting element 20 are disposed in series between the second high potential line 49 and the second low potential line 48 in the pixel circuit 71C according to Modification Example 6. Thus, when a potential of the output terminal 27 in the memory circuit 60 becomes Low (first potential) and the first transistor 31A is in the ON-state, the light emitting element 20 emits light. As with Example and Modification Examples described above, the luminance of the light emitting element 20 can also be increased and the variation in the threshold voltage $V_{th1}$ of the first transistor 31A affecting luminance of the light emitting element 20 can be substantially eliminated in Modification Example 6.

The enable line 44 is not needed in the pixel circuit 71C according to Modification Example 6, such that the number of wires and, thus, the number of wiring layers can be reduced. Thus, the number of manufacturing steps can be reduced and the production yield can be improved over Examples and Modification Examples described above. Further, the number of light-shielding wirings and, thus, the light-shielding area can be reduced. Thus, a higher resolution (finer pixels) can be achieved.

The above-described exemplary embodiments (Examples and Modification Examples) merely illustrate one aspect of the present invention, and any variation and application may be possible within the scope of the invention. For example, the followings are modified examples other than those described above.

Modification Example 7

While the gate of the first transistor 31 (or the first transistor 31A) is electrically connected to the output terminal 27 of the second inverter 62 in the memory circuit 60 in the pixel circuits of the above-described exemplary embodiments (Examples and Modification Examples), the present invention is not limited to such construction. The gate of the first transistor 31 (or the first transistor 31A) may be electrically connected to the output terminal 25 of the first inverter 61 in the memory circuit 60.

Modification Example 8

While the second transistor 32 is disposed between the input terminal 28 of the second inverter 62 (=the output terminal 25 of the first inverter 61) in the memory circuit 60 and the data line 43, and the second complementary transistor 38 is disposed between the input terminal 26 of the first inverter 61 (=the output terminal 27 of the second inverter 62) in the memory circuit 60 and the complementary data line 45 in the pixel circuits of the above-described exemplary embodiments (Examples and Modification Examples), the present invention is not limited to such construction. The second transistor 32 may be disposed between the input terminal 26 of the first inverter 61 (=the output terminal 27 of the second inverter 62) and the data line 43, and the second complementary transistor 38 may be disposed between the input terminal 28 of the second inverter 62 (=the output terminal 25 of the first inverter 61) and the complementary data line 45.

Modification Example 9

While the memory circuit 60 includes the two inverters 61 and 62 in the pixel circuits of the above-described exem-plary embodiments (Examples and Modification Examples), the present invention is not limited to such construction. The memory circuit 60 may include an even number of two or more inverters.

Modification Example 10

While the electro-optical device has been described by taking, as an example, the organic EL device in which the light emitting devices 20 formed of organic EL elements are aligned in 720 rows×3840 (1280×3) columns on the first substrate 11 formed of a single-crystal semiconductor substrate (single-crystal silicon wafer) in the above-described exemplary embodiments (Examples and Modification Examples), the electro-optical device in the present invention is not limited to such construction. For example, the electro-optical device may include a thin film transistor (TFT) as each transistor formed on the first substrate 11 formed of a glass substrate, or the electro-optical device may include a TFT on a flexible substrate formed of polyimide and the like. Further, the electro-optical device may be a micro LED display in which fine LED elements are aligned as light emitting devices in high density or a quantum dots display in which a nanosized semiconductor crystal material is used for the light emitting device. Furthermore, a quantum dot that converts incident light into light having a different wavelength may be used as a color filter.

Modification Example 11

While the electronic apparatus has been described in the above-described exemplary embodiments by taking, as an example, the see-through head-mounted display 100 incorporating the electro-optical device 10, the electro-optical device 10 of the present invention is also applicable to other electronic apparatuses including a closed-type head-mounted display. Other types of electronic apparatus include, for example, projectors, rear-projection televisions, direct-viewing televisions, cell phones, portable audio devices, personal computers, video camera monitors, automotive navigation devices, head-up displays, pagers, electronic organizers, calculators, wearable devices such as wristwatches, handheld displays, word processors, workstations, video phones, POS terminals, digital still cameras, signage displays, and the like.

The entire disclosure of Japanese Patent Application No. 2017-208899, filed Oct. 30, 2017 is expressly incorporated by reference herein.

What is claimed is:

1. An electro-optical device comprising:
   an enable line; and
   a substrate including:
   a scan line,
   a data line,
   a pixel circuit located at a position corresponding to an intersection of the scan line and the data line,
   a scan drive circuit supplying a scanning signal to the scan line,
   a first potential line supplying a first potential,
   a second potential line supplying a second potential lower than the first potential,
   a third potential line supplying a third potential, and
   a fourth potential line supplying a fourth potential lower than the third potential, wherein
   the pixel circuit includes:
   a light emitting element,
   a memory circuit, a first transistor of which a gate is electrically connected to the memory circuit,
a second transistor of which a gate is electrically connected to the scan line, and the second transistor is disposed between the memory circuit and the data line, and
a third transistor of which a gate is electrically connected to the enable line, the third transistor being disposed between the third potential line and the first transistor, wherein
the light emitting element and the first transistor are disposed in series between the third potential line and the fourth potential line,
the scan drive circuit is connected to the first potential line and the second potential line, and
A<B, wherein
A is an absolute value of a potential difference between the first potential and the second potential, and
B is an absolute value of a potential difference between the third potential and the fourth potential.

2. The electro-optical device according to claim 1, wherein
the substrate is formed of a single-crystal semiconductor substrate.

3. The electro-optical device according to claim 1, wherein
the first transistor is P-type.

4. The electro-optical device according to claim 3, wherein
the third transistor, the first transistor and the light emitting element are disposed in series between the third potential line and the fourth potential line.

5. The electro-optical device according to claim 1, wherein
the first transistor and the third transistor are P-type.

6. The electro-optical device according to claim 1, wherein
the memory circuit is electrically connected to the first potential line and the second potential line.

7. The electro-optical device according to claim 1, wherein
the first transistor and the second transistor are N-type.

8. The electro-optical device according to claim 7, wherein
the third transistor is N-type and disposed between the fourth potential line and the first transistor.

9. An electronic apparatus comprising the electro-optical device according to claim 1.

10. An electro-optical device comprising:
a scan line;
a data line;
a pixel circuit located at a position corresponding to an intersection of the scan line and the data line;
an enable line; and
a scan drive circuit supplying a scanning signal to the scan line, wherein the pixel circuit includes:
a light emitting element,
a first transistor which controls a driving current for the light emitting element, the first transistor and the light emitting element are disposed in series between a third potential and a fourth potential,
a second transistor of which a gate is electrically connected to the scan line, and one of a source and a drain of the second transistor is connected to the data line, and
a third transistor of which a gate is electrically connected to the enable line, the third transistor being disposed between the third potential line and the first transistor,
the scan drive circuit is connected to a first potential and a second potential,
the third potential is higher than the first potential,
the first potential is higher than the second potential, and
the second potential is higher than the fourth potential.

11. The electro-optical device according to claim 10, wherein
the first transistor and the third transistor are P-type.

12. An electro-optical device comprising:
a scan line;
a data line;
a pixel circuit located at a position corresponding to an intersection of the scan line and the data line;
an enable line; and
a scan drive circuit supplying a scanning signal to the scan line, wherein the pixel circuit includes:
a light emitting element,
a first transistor which controls a driving current for the light emitting element, the first transistor and the light emitting element are disposed in series between a third potential and a fourth potential,
a second transistor of which a gate is electrically connected to the scan line, and one of a source and a drain of the second transistor is connected to the data line, and
a third transistor of which a gate is electrically connected to the enable line,
the third transistor is disposed between the fourth potential and the first transistor,
the scan drive circuit is connected to a first potential and a second potential,
the third potential is higher than the first potential,
the first potential is higher than the second potential, and
the second potential is higher than the fourth potential.

13. The electro-optical device according to claim 12, wherein
the first transistor and the third transistor are N-type.

14. An electro-optical device disposed on a single crystal silicon substrate comprising:
a scan line;
a data line;
an enable line;
a pixel circuit located at a position corresponding to an intersection of the scan line and the data line;
a scan drive circuit supplying a scanning signal to the scan line,
a first potential line supplying a first potential,
a second potential line supplying a second potential,
a third potential line supplying a third potential, and
a fourth potential line supplying a fourth potential, wherein
the pixel circuit includes:
a light emitting element,
a first transistor which controls a driving current for the light emitting element, the first transistor and the light emitting element are disposed in series between the third potential line and the fourth potential line,
a second transistor of which a gate is electrically connected to the scan line, and one of a source and a drain of the second transistor is connected to the data line, and
a third transistor of which a gate is electrically connected to the enable line, the first potential line and the second potential line connect to the scan drive circuit to operates thereof, wherein the third potential is higher than the first potential, the first potential is higher than the second potential, the second potential is higher than the fourth potential, the third transistor is disposed between the third potential line and the first transistor, and the first transistor and the third transistor are P-type.

15. An electro-optical device disposed on a single crystal silicon substrate comprising:
 a scan line;
 a data line;
 an enable line;
 a pixel circuit located at a position corresponding to an intersection of the scan line and the data line;
 a scan drive circuit supplying a scanning signal to the scan line,
 a first potential line supplying a first potential,
 a second potential line supplying a second potential,
 a third potential line supplying a third potential, and
 a fourth potential line supplying a fourth potential, wherein
the pixel circuit includes:
 a light emitting element,
 a first transistor which controls a driving current for the light emitting element, the first transistor and the light emitting element are disposed in series between the third potential line and the fourth potential line,
 a second transistor of which a gate is electrically connected to the scan line, and one of a source and a drain of the second transistor is connected to the data line, and
 a third transistor of which a gate is electrically connected to the enable line,
 the first potential line and the second potential line connect to the scan drive circuit to operates thereof, wherein
the third potential is higher than the first potential,
the first potential is higher than the second potential,
the second potential is higher than the fourth potential,
the third transistor is disposed between the fourth potential line and the first transistor, and
the first transistor and the third transistor are N-type.

16. An electro-optical device comprising:
an enable line, and
a substrate including;
 a scan line,
 a data line,
 a pixel circuit located at a position corresponding to an intersection of the scan line and the data line,
 a scan drive circuit supplying a scanning signal to the scan line,
 a first potential line supplying a first potential,
 a second potential line supplying a second potential lower than the first potential,
 a third potential line supplying a third potential, and
 a fourth potential line supplying a fourth potential lower than the third potential, wherein
the pixel circuit includes,
 a light emitting element,
 a memory circuit,
 a first transistor of which a gate is electrically connected to the memory circuit,
 a second transistor of which a gate is electrically connected to the scan line, and the second transistor is disposed between the memory circuit and the data line, and
a third transistor of which a gate is electrically connected to the enable line, wherein
the first transistor is P-type,
the third transistor, the first transistor and the light emitting element are disposed in series between the third potential line and the fourth potential line,
the scan drive circuit is connected to the first potential line and the second potential line, and
A<B, wherein
A is an absolute value of a potential difference between the first potential and the second potential, and
B is an absolute value of a potential difference between the third potential and the fourth potential.

17. The electro-optical device according to claim 16, wherein
the third transistor is disposed between the third potential line and the first transistor.

18. The electro-optical device according to claim 17, wherein
the third transistor is P-type.

* * * * *